US009027740B2

(12) United States Patent
Boehrer

(10) Patent No.: US 9,027,740 B2
(45) Date of Patent: May 12, 2015

(54) TRANSPORT APPARATUS WITH MOVING TRUCKS

(75) Inventor: Manfred Boehrer, Hardheim (DE)

(73) Assignee: Boehrer GmbH, Hoepfingen (DE)

( * ) Notice: Subject to any disclaimer, the term of this patent is extended or adjusted under 35 U.S.C. 154(b) by 0 days.

(21) Appl. No.: 13/701,836

(22) PCT Filed: Mar. 10, 2011

(86) PCT No.: PCT/DE2011/000245
§ 371 (c)(1),
(2), (4) Date: Dec. 4, 2012

(87) PCT Pub. No.: WO2011/153974
PCT Pub. Date: Dec. 15, 2011

(65) Prior Publication Data
US 2013/0140142 A1 Jun. 6, 2013

(30) Foreign Application Priority Data
Jun. 8, 2010 (DE) .......................... 10 2010 023 062

(51) Int. Cl.
*B65G 17/20* (2006.01)
*B65G 17/38* (2006.01)
*B65G 23/14* (2006.01)

(52) U.S. Cl.
CPC .............. *B65G 17/20* (2013.01); *B65G 17/385* (2013.01); *B65G 23/14* (2013.01)

(58) Field of Classification Search
USPC ...................... 198/678.1, 710, 712; 104/138.1
See application file for complete search history.

(56) References Cited

U.S. PATENT DOCUMENTS

| 2,646,160 | A | * | 7/1953 | Michna | 198/845 |
| 3,250,379 | A | * | 5/1966 | Leach | 198/732 |
| 3,269,525 | A | * | 8/1966 | Paulski | 198/822 |
| 3,382,992 | A | * | 5/1968 | Couchman, III | 198/680 |
| 3,744,618 | A | * | 7/1973 | Monne et al. | 198/500 |
| 3,757,514 | A | * | 9/1973 | Reist | 59/78 |
| 4,294,345 | A | * | 10/1981 | Stauber et al. | 198/683 |
| 4,397,145 | A | * | 8/1983 | Reist | 59/78 |
| 4,513,857 | A | * | 4/1985 | Leach | 198/716 |
| 4,638,906 | A | * | 1/1987 | Winiasz | 198/803.9 |
| 4,838,410 | A | * | 6/1989 | Gough | 198/706 |
| 5,411,133 | A | * | 5/1995 | Lyndhurst | 198/845 |

(Continued)

FOREIGN PATENT DOCUMENTS

DE 151868 4/1902
DE 738491 8/1943

(Continued)

OTHER PUBLICATIONS

International Search Report for PCT/DE2011/000245, English translation attached to original, Both completed by the European Patent Office on Jul. 19, 2011, All together 7 Pages.

*Primary Examiner* — William R Harp
(74) *Attorney, Agent, or Firm* — Stolmar & Partner; Robert Lelkes

(57) ABSTRACT

A transport apparatus for transporting goods, wherein a moving truck arrangement having at least two moving truck elements can be displaced along a guide track, wherein great spatial freedom of design of the guide track is made possible. The moving truck arrangement can be moved both in a pulling and in a pushing manner by a drive mechanism and the goods can be transported by the individual moving truck elements.

18 Claims, 14 Drawing Sheets

(56) References Cited

U.S. PATENT DOCUMENTS

| | | |
|---|---|---|
| 6,152,641 A | 11/2000 | Rabe |
| 6,155,405 A * | 12/2000 | Siebenmann et al. ........ 198/795 |
| 6,786,327 B2 * | 9/2004 | Ashida et al. ................ 198/852 |
| 7,025,656 B2 * | 4/2006 | Bailey .......................... 446/444 |
| 7,086,525 B2 | 8/2006 | Kilby et al. |
| 7,404,549 B2 * | 7/2008 | Meier et al. ................ 270/52.14 |
| 7,975,838 B2 | 7/2011 | Reist |
| 2004/0084288 A1 | 5/2004 | Ashida et al. |
| 2005/0155843 A1 * | 7/2005 | Meier et al. ................ 198/470.1 |

FOREIGN PATENT DOCUMENTS

| | | |
|---|---|---|
| DE | 945014 | 6/1956 |
| DE | 1254529 | 11/1967 |
| DE | 2203495 | 8/1973 |
| DE | 19917806 | 10/2000 |
| FR | 1130690 | 2/1957 |
| GB | 636355 | 4/1950 |
| GB | 2419863 | 5/2006 |
| JP | S55-115511 A | 9/1980 |
| JP | H03-042367 A | 2/1991 |
| JP | H07-117825 A | 5/1995 |
| JP | H07-046829 Y | 10/1995 |
| JP | H09-048344 A | 2/1997 |
| JP | 2001-253522 A | 9/2001 |
| JP | 2005-201383 A | 7/2005 |
| JP | 2006-232545 A | 9/2006 |
| JP | 3137917 U | 12/2007 |
| WO | 2008092287 | 8/2008 |

* cited by examiner

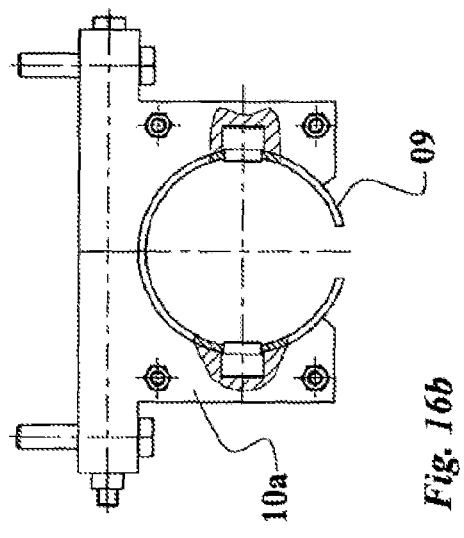
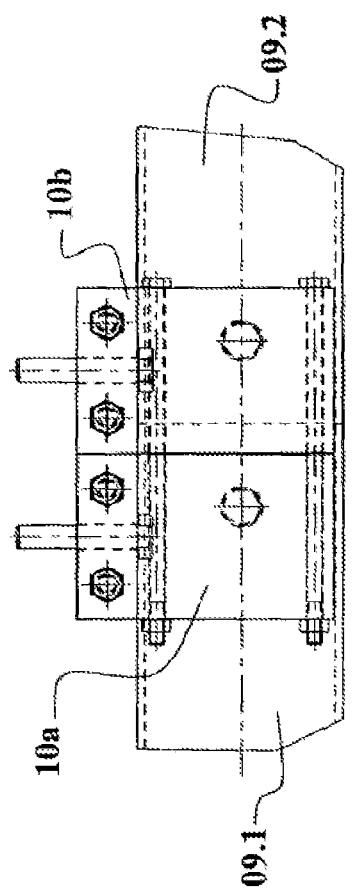
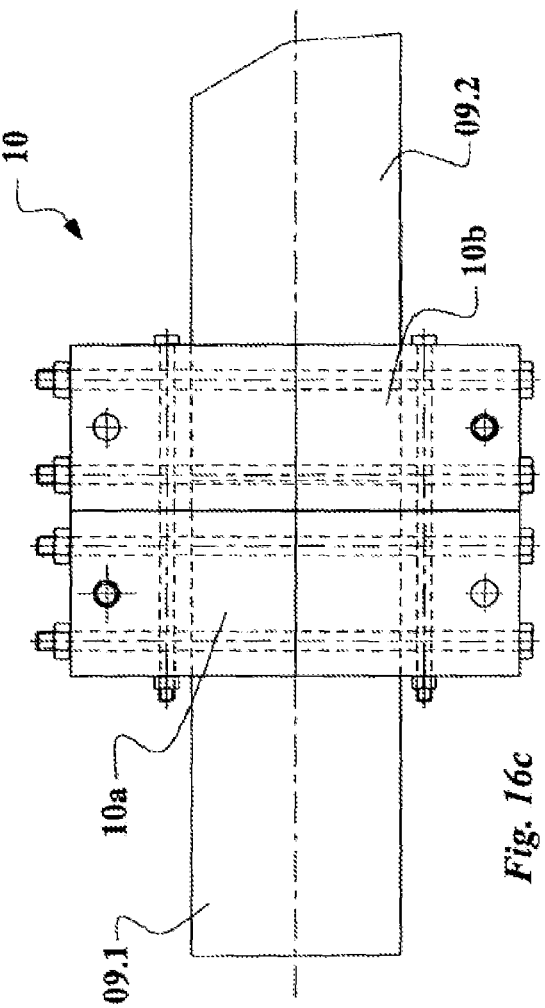
Fig. 16b
Fig. 16a
Fig. 16c

TRANSPORT APPARATUS WITH MOVING TRUCKS

FIELD OF THE INVENTION

The invention relates to a transport apparatus for conveying in particular pellet-like products, where the conveying is effected by means of a moving truck arranged on a guide track.

BACKGROUND OF THE INVENTION

The most varied embodiments of transport apparatuses are known from the prior art. In the present case, the transport apparatus relates to such types of embodiments where moving trucks are displaceable along guide tracks. In this connection, the guide track, as a rule, consists of straight or curved profile rails on which the moving trucks are mounted so as to roll and/or slide. A generally known exemplary embodiment is the overhead conveyor where a moving body is arranged on a profile rail, the load being suspended from the moving body. Consequently, it is possible in a simple manner to convey loads along the guide track.

In order to be able to move a plurality of loads at the same time, it is known to use moving trucks which can be coupled to each other. Consequently, it is possible to convey several moving trucks together when one single moving truck is driven. An example for a transport apparatus of this type is shown in document DE 199 17 806 A1. The case described here is a transport apparatus in the manner of an overhead conveying apparatus, where carrying trucks are arranged so as to be displaceable on running rails. In this connection, each carrying truck has a connecting strut, at each of the two ends of which are mounted a pair of rollers, which, in turn, encompass the corresponding running rail. Consequently, the carrying truck is freely displaceable along the running rail. In the prior art, the connecting strut in the case of such an overhead conveyor is situated lying in parallel below the running rail. The load to be conveyed can then be mounted in a suitable manner on the connecting rail. For coupling the plurality of carrying trucks, a coupling device with a hook-shaped coupling element is present at both ends of each carrying truck, it being possible in a corresponding manner to engage a hook of a first carrying truck with a hook of a second carrying truck. As a result, when the first carrying truck is pulled, all the coupled carrying trucks are entrained.

A particular advantage of said solution is that the individual carrying trucks are able to be coupled to each other and uncoupled from each other in a flexible and simple manner. To this end, it is simply necessary to hook the coupling devices out of or into each other on the carrying truck by means of a vertically upward movement against the downwardly pulling load.

A problem with the aforedescribed solution, however, is, on the one hand, that it is not possible to exert shear forces unrestrictedly onto a conveying truck for the simultaneous conveying of the conveying truck in front. The reason for this, on the one hand, is in the non-symmetrical coupling by means of the hook-shaped coupling devices. This results in an irregular introduction of the shear force onto the individual carrying trucks. On the other hand, the position of the couplings at a spacing from the running rail is a disadvantage. As a result, this leads to the individual carrying trucks possibly breaking out from the vertically hanging position of the individual carrying trucks, in particular during the course of running rail curves. In this respect, the embodiment presented is advantageous for conveying in a pulling manner and less for conveying in a pushing manner. In addition, it must be taken into account that in the aforedescribed embodiment, an automatic drive for the individual conveying trucks is only possible with difficulty. The reason for this in particular is that there is no suitable application point for an automatic drive. At best, it is conceivable to utilize the vertical strut in the connection between the connecting strut and the rollers in order to exert a pulling movement there onto the front-most carrying truck by means of a fork-like drive.

Consequently, it is the object of the present invention to provide a transport apparatus where, unlike the known solutions from the prior art, greater flexibility with regard to the development of the guide track is obtained and in this connection, at the same time, individual moving trucks or moving truck groups are able to be conveyed in an automatically driven manner.

SUMMARY OF THE INVENTION

The present object is achieved by a transport apparatus (01, 101, 201) for conveying in particular pellet-like products, in particular pharmaceutical products, said transport apparatus having a guide track (03) and a drivable moving truck arrangement (15) which is arranged on the guide track (03) and has at least two moving truck elements (16, 17) which each have a connecting strut (35, 36), on the first end of which is arranged at least one moving body (21, 121, 221) which is guided in a sliding or rolling manner along the guide track (03), characterized in that the moving body (21, 121, 221) has a first articulated element (26) and the second end of the connecting strut (35) has a second articulated element (37), wherein the first articulated element (26) of a first of the two moving truck elements (16, 17) and the second articulated element (37) of the second of the two moving truck elements (16) are connectable together in an articulated manner.

BRIEF DESCRIPTION OF THE DRAWINGS

To clarify the solution according to the invention, a particularly advantageous embodiment is outlined in the accompanying figures, in which:

FIG. 11 shows a vertical sectioned representation of a portion of the transport apparatus 01 with a horizontal straight track portion 09a;

FIG. 16 shows an exemplary embodiment for segment connectors 10 for connecting individual rail segments 09 of the embodiment according to FIG. 1.

DETAILED DESCRIPTION OF THE INVENTION

Figure 1:
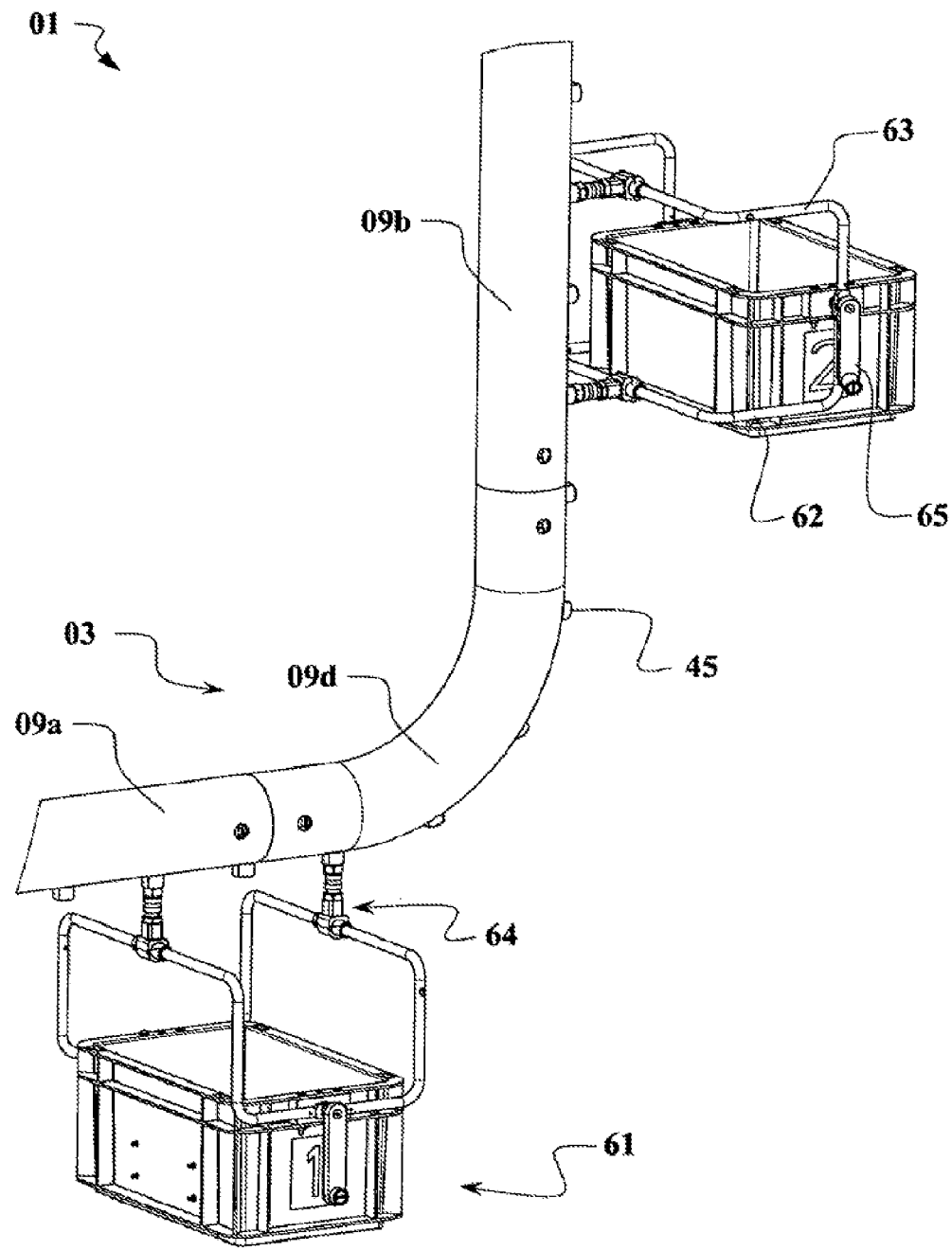
FIG. 1 shows a portion of an exemplary embodiment of a transport apparatus 01 with a moving truck arrangement 15 as well as two product carriers 61.

A generic transport apparatus serves for conveying, in particular, pellet-like products, in particular pharmaceutical products. In this connection, pellet-like products are not limited only to bulk goods, but can be of a varied type. In this respect, the conveying of liquid products is also possible, if said products are conveyed in corresponding vessels. In this respect, the transport apparatus relates to the conveying of products of any type, insofar as the products can be conveyed in a separable manner.

In this connection, the generic transport apparatus has a guide track and a moving truck arrangement which is arranged on the guide track. In addition, the transport apparatus is characterized in that the moving truck arrangement is driveable. Which type the drive is in this connection is initially unimportant. It is provided at least that the moving truck arrangement can be driven as such—without taking into consideration the product to be conveyed or a product carrier used in this connection. In particular, this does not refer to a manual drive, but rather to the use of an automatic or electric drive. This means that the moving truck arrangement is able to be set in motion by a drive.

The moving truck arrangement, in this connection, includes at least two moving truck elements, each moving truck element, in turn, having a connecting strut, on the first end of which is arranged at least one moving body. In this connection, the moving body can be displaced in the guide track in a sliding or rolling manner. In this respect, the moving truck arrangement is guided on the guide track by means of the moving body. An essential feature of the generic transport apparatus, in this connection, is that at least two moving truck elements form one moving truck arrangement, it being possible to move one moving truck arrangement inside the guide track irrespective of the presence of another moving truck arrangement. I.e. said embodiment of the transport apparatus is to be differentiated fundamentally from that where a continuous transport chain is used.

The embodiment according to the invention is now characterized in that the moving body has a first articulated element and that the second element of the connecting strut has a second articulated element. In this connection, it is provided that the first articulated element of a first moving truck element and the second articulated element of the second moving truck element are connectable together in an articulated manner. In this respect, a moving truck arrangement has at least two moving truck elements which are connected together via the coupling together of the first and the second articulated element.

In particular, it is necessary to note when designing the articulated connection that stabilization of the position of the individual moving truck elements is carried out to the effect that each moving truck element of the moving truck arrangement—disregarding a last moving truck element of a moving truck arrangement—only requires one moving body in each case. In this respect, the position of a moving truck element at a first end is determined by the moving body of the moving truck element and the position at the second end is determined by the position of the moving body of the following moving truck element by means of the coupling via the articulated connection. I.e. each moving truck element, in its turn, only has to have just one moving body. The position of the individual moving truck elements in relation to the guide track is consequently determined by the two moving bodies—those of the respective moving truck element and of the following moving truck element—and the expansion of the connecting strut. In this respect, a stable position of each moving truck element is provided, it being possible to align the connecting strut in an advantageous manner in parallel with the guide track.

In a preferred embodiment, the transport apparatus has at least one double moving truck element having a double connecting strut, at the two ends of which at least one moving body is arranged. When looking at the shortest possible moving truck arrangement, this consequently has one single regular moving truck element as previously described and one single double moving truck element. In the case of the double moving truck element, corresponding to the other regular moving truck element, once again at least one moving body is provided with a first articulated element which is connectable in an articulated manner to the second articulated element of the other regular moving truck element.

As a result of the open-ended length of the moving truck arrangement, an advantageous solution for ensuring a stable position of all the associated moving truck elements is required. Said solution is realized in a particularly advantageous manner with reference to the two moving truck elements located at the ends in that a regular moving truck element is arranged at a first end of the moving truck arrangement, the single moving body of which being located at the same time at the end of the moving truck arrangement. The double moving truck element provided with moving bodies on both sides is arranged, in contrast, at the other end of the moving truck arrangement. Consequently, this ensures that one moving body is arranged in each case at both ends of the moving truck arrangement. At the same time, the achievement is that each moving truck element is mounted on the guide track by two moving bodies which are spaced apart. In this connection, the regular moving truck elements just have one moving body, only the double moving truck element located at the second end having two moving bodies.

It is particularly advantageous when both moving bodies of the double moving truck element have in each case a first articulated element on both sides. Consequently, it is possible to use the double moving truck element inside the moving truck arrangement. The regular moving truck elements can connect in the opposite direction on both sides. It is also consequently ensured that a moving body is positioned in each case at both ends of the moving truck arrangement.

It is particularly advantageous in this connection when the double moving truck element is realized in a symmetrical manner, in particular two identical moving bodies being arranged on both sides of a double connecting strut so that, as a result, the production costs can be kept down.

In addition, it is advantageous to provide a connecting moving truck element. In this case, a connecting moving truck element has a second articulated element in each case on both sides of a connecting connecting strut. Consequently, it is possible to couple two regular or double moving truck elements to first articulated elements via the respective moving bodies. Consequently, a large amount of flexibility is achieved, in particular with regard to changing the configuration of the moving truck arrangement in operation.

In a second embodiment in this respect, the transport apparatus is formed by at least one moving truck arrangement which is formed from two double moving truck elements and an interposed connecting moving truck element. By increasing the number of each double moving truck element and connecting moving truck element, the length of the moving truck arrangement can be expanded in a selective manner. In this respect, no further explanations are required other than that reference can be made to the aforedescribed embodiment.

Irrespective of which of the aforedescribed variants is selected, a moving truck arrangement, all in all, has at least one, in particular precisely one, moving body more than there are connecting struts present. The reason for this is that the two ends of the moving truck arrangement are characterized by moving bodies. In this connection, the moving body is not forcibly the geometrical end of the moving truck arrangement. Depending on the embodiment of the moving truck elements, whether they be regular moving truck elements with one moving body in each case or double moving truck elements, it is also admissible and possible, for example, to have a part portion of a connecting element going beyond the moving body at the ends of the moving truck arrangement. The relevant point here is that at the end of the moving truck arrangement only the moving bodies abut against the guide track and no other component parts of the moving truck elements.

To generate a defined position of the moving truck elements with reference to the guide track, it is particularly advantageous when the moving body has at least three, in particular four, rotatably mounted rollers which are arranged on the periphery. The use of rollers realizes a rolling movement along the guide track. This consequently enables a low-wear and low-energy movement of the moving truck arrangement along the guide track. The use of three, in particular four rollers, in this connection, ensures positioning of the moving bodies and consequently of the moving truck elements radially with respect to the guide track irrespective of the three-dimensional development thereof.

It is particularly advantageous in this connection when at least one of the rollers is mounted elastically on the moving body. In particular when four rollers are used, it is advantageous to mount two of the rollers elastically. This concerns a flexibility radially with respect to the axis of the guide track. Consequently, it can be ensured that all the rollers fit in the guide track in a play-free manner, it being possible to compensate for any tolerances present. In addition, uncontrolled clattering between the moving body and the guide track is prevented by the elastic bearing arrangement.

To realize the guide track, it is particularly advantageous when said guide track is built up from several segments depending on the development of the track. Consequently, it is possible, for example, to provide standardized track curves at different angles for horizontally as well as for vertically aligned track developments.

To connect the guide track segments, it is once again particularly advantageous to use separate segment connections. In this connection, a segment connector half is mounted at both ends of the segment. These are preferably realized in an identical manner. The joining together of the segments is effected in this connection by connecting the segment connector halves.

In addition, it is advantageous when the segment connector halves are mounted in such a manner that at one end of the segment the segment connector half protrudes beyond the track segment and at the other end the track segment protrudes beyond the segment connector half. Consequently, the flush transition between the track segments is ensured by the protruding track segment being pushed into the protruding segment connector half which, in this respect, encompasses the two connecting track segments.

With the use provided in accordance with the invention of individual moving truck arrangements or at least one moving truck arrangement, it is additionally made possible to provide points in the development of the track. Consequently, branches can be provided in the development of the guide track and the moving truck can be directed to different places in different track branches depending on the requirement. Although it would be possible to perform a reversal of a track portion including the moving truck arrangement, it is advantageous when a point is used in the track development in a comparable manner to a rail point or an exchangeable point segment. Consequently, to steer the moving truck arrangement in the track development with the assignment to certain track branches, only the position of the points needs to be changed, the moving truck arrangement, in this connection, running through the point in a flowing manner from one previous track section to the following track section via the point.

Although there are the most varied possibilities for developing the guide track, it is particularly advantageous when the guide track is realized in the form of a guide rail which is slotted substantially over the entire length. In this connection, the moving bodies of a moving truck arrangement are arranged substantially inside the guide track. In this connection, it is initially insignificant whether the guide track is a circular shape or a rectangular shape or the like in cross section. At least the moving body is situated inside said cross section of the guide track and abuts by way of the sliding or rolling faces against a face of the guide track pointing to the interior.

In this connection it is provided in particular that the connecting strut is also positioned between the moving bodies inside the guide track. In this respect, of necessity, the articulated elements also lie inside the cross section of the guide track. Said arrangement of the guide track with respect to the moving bodies or the articulated elements and the connecting strut creates a particularly flexible and at the same time stable running embodiment. It is particularly advantageous in this connection when the articulated connection has a pivot point close to the center point of the guide track to enable, consequently, a uniform movement irrespective of the track developments. In addition, the force transfer point lying consequently centrally with respect to the guide track improves a stable position of the moving truck arrangement.

For accommodating the load, in a particularly advantageous manner a load carrier is arranged on at least one moving truck element, preferably arranged substantially vertically with respect to the center longitudinal axis of the moving truck element. In this connection, the load carrier projects through the slot of the guide rail out of said guide rail. In this respect, the moving truck element with the moving body, the connecting strut and the articulated elements is positioned inside the cross section of the guide rail, whilst in this connection the load carrier protrudes out of the guide track. Which type said load carrier is, is initially unimportant in this connection. The important thing is that the product to be conveyed is able to be conveyed on the load carrier by means of suitable devices.

It is particularly advantageous when the load carrier is fastened on or incorporated in the moving body. Production is consequently simplified without forfeiting flexibility. In the event of a multiple-part moving body, the load carrier is advantageously fastened on the first component to which the connecting strut is also linked.

As an alternative to this, it is also possible to link the load carrier to the connecting strut. However, in the event of a plug-in connection between the connecting strut and the moving body, the loads occurring must also be transferred at least for the most part via said plug-in connection.

It is particularly advantageous in this connection when a guide element is arranged on the load carrier, by way of which guide element the load carrier is guided in the slot of the guide rail. Consequently, the rotational position of the moving truck element in relation to the guide track is established by means of the load carrier at the same time. In the simple case, this can be a sliding guide of a guide element with the size selected to fit the width of the slot. In a particularly advantageous embodiment, a guide element which is mounted so as to roll is selected for this purpose. In each case, the assignment of the guide element inside the slot ensures that the load carrier, and consequently at the same time the moving truck element, assumes a rotationally defined position with respect to the longitudinal axis of the guide track. Consequently, the position of the load carrier or of the moving truck element is not left up to the weight of the load pulling downward, but the position is rather predetermined in a defined manner. This is especially particularly advantageous when, for example, the load carrier is not to hang downward exactly vertically or a helical track development is to be realized.

To convey different products in a flexible manner it is particularly advantageous when preferably shell-like or basket-like product carriers are used, which, in turn, are fastened on at least one load carrier of a moving truck element. Consequently, different products can be conveyed inside the product carrier.

It is particularly advantageous in this connection when the product carrier is linked by way of at least one articulated strut to the load carrier. In this connection, a pivoting movement between the articulated strut and the product carrier is to be made possible. In this respect, it is possible to select a track guide which is curved in the vertical, where the product conveying extends, for example, in a vertical manner, the basket-like product carrier always being able to pivot into the horizontal and consequently the product to be conveyed being transported safely in the product carrier without falling out.

For reversing, it is possible in the simplest case to link the articulated strut fixedly to the load carrier or to realize it as a component. Consequently, the spacing to the guide track necessary for the pivotability of the product carrier is realized.

However, a connection between the articulated strut and the load carrier by means of a quick acting closure connection is particularly preferred. By means of the quick acting closure it is possible to exchange the product carrier with its articulated connection in a quick and flexible manner, to select one depending on the actual requirements and to mount it by means of the quick acting closure.

For better load distribution, it is particularly advantageous, however, when one product carrier is linked in each case to two load carriers of one moving truck arrangement. In this connection, the connection between the product carriers and the two load carriers is effected in each case by way of articulated struts. In this connection, a pivotable link both between the load carrier and the articulated strut and between the articulated strut and the product carrier is necessary. In this respect, the quick acting closure is advantageously expanded to form a quick acting closure articulated connection. Realizing curved track developments in a vertical plane requires a joint with pivotability about a horizontal pivotal axis lying perpendicular with respect to the guide track. Curved track developments in a horizontal plane require rotatability in the articulated connection about a vertical rotational axis lying perpendicular with respect to the guide track. Three-dimensional developments of the guide track are consequently made possible by combining both articulated movements and nevertheless a stable and secure position of the product carrier is ensured.

The applicability of the transport apparatus according to the invention is additionally improved by one development of the product carrier by means of pivotability. In this connection, the product carrier receives a pivot bearing with a horizontal rotational axis. At the same time, said rotational axis can be the rotational axis in the connection of the articulated struts. In said advantageous embodiment, the product carrier is at least expanded, for example by means of a carrier pivot lever, to the effect that an external pivoting mechanism is able to cooperate with the carrier pivot lever and pivots the product carrier about the rotational axis and consequently, for example, tips out the contents of the product carrier.

An essential aspect of the present invention is to enable an automatic drive, although this is not a prerequisite in the application thereof. Relating to this, it is particularly advantageous when, in addition, a shear force is transferable from one moving truck element to a moving truck element in front by means of the articulated connection between the individual moving truck elements—a pulling force generally not proving a problem. Consequently, the applicability of the transport apparatus is clearly improved by said embodiment compared to the prior art. In particular, by means of the newly created embodiment, the use of a mechanical drive is considerably simplified in that when the moving truck arrangement passes a drive point, all the moving truck elements can be drivable and consequently initially a pulling force is present in the interlocking in the articulated connections, changing to a shear force.

By coupling two moving truck elements by means of the articulated connection, a positionally stable connection of the moving truck arrangement can be created. It is particularly advantageous in this connection when the two articulated elements prevent a relative movement toward each other in a substantial manner and just allow a pivoting movement, i.e. only the play necessary for pivotability is present. Consequently, a movement of the moving truck arrangement can be used in an unrestricted manner for a pulling force or selectively by a pushing force.

In this respect, a pulling or pushing movement does not lead to pulling the entire moving truck arrangement apart or pushing it together, as is the case as a rule in the prior art. Consequently, a clearly improved uniformity in the movement of the moving truck arrangement can be obtained. Likewise, it is consequently also not a problem when the moving truck arrangement is taken up at two drive points at the same time. As a result of the invariable length of the entire moving truck arrangement, a uniform drive at two points also results in a constant movement pattern. In contrast, it can easily occur in the prior art that a pushed together moving truck arrangement is pulled, in turn, in length if taken hold of by a second drive or selectively enters into a compressed movement which, in turn, can result in a breakout from the track movement.

It is particularly advantageous in this connection when the articulated connection is realized in such a manner that along with axial forces additionally also radial forces are transferred inside the articulated connection from one moving truck element to the other moving truck element. Consequently, the development of the device necessary for carrying the products is simplified in a considerable manner. Through the radial support in the articulated elements, the forces occurring in the case of the moving truck elements by the conveying of the products and acting offset to the guide track do not result in a breakout from the guide track.

It is particularly advantageous in this connection when the center point of the articulated connection is at as small a spacing as possible to the guide faces in contact between the moving bodies and the guide track. Said arrangement makes possible an extensively uniform movement of the moving truck arrangement or of the individual moving truck elements along the guide track even where there are curved developments. In addition, the pulling and pushing forces to be transferred in the development of the curves do not result or only result inconsiderably in forces which lie transversely with respect to the axis of the guide track at a spacing from the guide track. In the case of arrangements known in the prior art with coupling connections spaced from the guide track, the result there, in contrast, in particular in the case of a pushing movement or in the case of three-dimensional track developments, is unstable movements. In this respect, embodiments known in the prior art are preferably only suitable for a pulling movement in the case of simple three-dimensional movement patterns.

Relating to this, this is advantageous in particular when—as described beforehand—the center point of the articulated connection is arranged inside or on the center axis of the guide track or of the respective moving body. As a result, the articulated connection is positioned inside the guide track, which makes it possible for the first time to allow the guide track to twist along its axis. Consequently, for example, a helical movement of the moving truck arrangement can be realized along the guide track. Movement patterns of this type are almost excluded in the prior art.

To make as flexible as possible a development of the guide track possible, in particular in the design with curved developments, both in the horizontal and in the vertical, as well as to transfer both axial and radial forces, it is particularly advantageous when the articulated connection is realized as a ball connection. In this connection, the first articulated element of the moving body is formed by a ball accommodating means and the second articulated element, arranged at the opposite end of the connecting strut, is formed as an articulated ball. Consequently, it is possible to pivot and/or rotate the two connected moving truck elements toward each other between two moving truck elements connected by means of an articulated element, at the same time axial and radial positioning being ensured. Said embodiment creates a particularly large amount of freedom with regard to the development of the guide track. Consequently, track developments are possible which otherwise would not be possible.

The ball receiving means is realized in a particularly advantageous manner when said ball receiving means is formed of multiple parts with a ball cup and at least one ball sleeve portion. In this connection, a multiple-part method of construction of the moving body is required with a first component on which the connecting strut is mounted so as to be releasable or fixed or integral, and with at least one second component. The ball cup is to be associated with the first component and the ball sleeve portion is to be associated with the second component, it being possible for the ball cup or the ball sleeve portion in each case to be component parts of the respective component or to connect hereto by means of a further separate component.

In an advantageous design, the first component forms a moving body half and the second component forms a moving body quarter, the second component, in turn, being present twice and in this respect also forming a moving body half.

In a first particularly advantageous variant for forming the ball joint, the parting plane between the first and the second component or between the ball cup and the ball sleeve portion can be placed vertically with respect to a center longitudinal axis of the moving truck element.

It is particularly advantageous in this respect when the bearing arrangement of the rollers is also placed into the parting plane between the first and the second component. This makes it possible that as the second component is mounted onto the first component, at the same time the second articulated ball is taken up and the rollers secured.

In addition, when forming a ball joint it is advantageous when the ball cup forms a substantially end-face contact surface for the articulated ball as the second articulated element of the adjacent moving truck element to be connected in an articulated manner in each case. The ball sleeve portion encompasses the articulated ball and is thereby connected to the first component. In this respect, a ball joint connection between the first and second articulated element is generated by enclosing the articulated ball by the first and second component by way of the ball cup and the ball sleeve portion.

To compensate for tolerances and to avoid play inside the ball joint connection, it is particularly advantageous when the ball cup is resiliently mounted in the first component. In this respect, it is obvious that the ball cup is arranged on the first component as a separate component. In this respect, a direct connection between the first component and the ball cup is not required as long as it is ensured that the ball cup remains at the site of installation. This is ensured at the same time in an advantageous manner in that the ball cup is pressed against the articulated ball of the following moving truck element by a spring element which is supported in the first component. It is advantageous in this connection when the ball cup is mounted as a component in a guide on the first component and consequently only has mobility in the direction of the articulated ball to be taken up.

In a second design variant for the ball joint connection, the parting plane is arranged between the ball cup and the ball sleeve portion in a center longitudinal axis of the moving truck element. I.e. the parting between the first component connected to the connecting strut and the second component is effected parallel to the guide track. This is advantageous to the effect that, consequently, the second component only has to encompass the articulated ball of the following moving truck portion and does not have to fulfill any other further functions—although this is also possible. Consequently, the second component can be held in a very simple manner and the connection between the moving truck elements is developed in a very simple manner by inserting the articulated ball into the ball cup and placing and fastening the second component thereon with the ball sleeve portion.

The center longitudinal axis of the moving truck element refers in this connection to a line which is substantially parallel to the guide track and runs centrally through the unit made up by the moving body, the connecting strut and the articulated elements. In this connection, said axis does not have to run precisely through the volume center point nor through the shear point.

In both design variants, a ball joint connection is created in an advantageous manner, the first articulated element being created by means of joining two ball shell portions, the ball-shaped second articulated element being included. This creates a play-free articulated connection, the necessary pivotability being ensured and it being possible nevertheless to transfer axial and radial forces.

To create as much flexibility as possible with regard to the development of the transport apparatus, in particular the moving truck arrangement, it is particularly advantageous when the moving body and/or the second articulated element are fastened to the connecting strut, in particular in a releasable manner. On one hand, said development makes possible the embodiment where the second component of the moving body is arranged with the ball sleeve portion in a surrounding manner behind the second articulated element or the articulated ball and, on the other hand, is connected to the first component of the moving body.

An essential point is the enabling of a variation in the transport apparatus on the basis of a limited variety of parts. In particular, this means that flexible embodiments, for example with regard to the length of the connecting strut or of the moving truck element, can be created. By means of a small variation in connecting struts or components, a large variation in embodiments can be created, for: different loads by means of the design of the moving body, different curve radii of the guide tracks by means of the length of the connecting struts, different products by means of the corresponding selection of the product carriers and the linking of same to the moving truck elements. As a result, along with making a large variation in application possible, a cost advantage in production is achieved.

It is additionally advantageous when the connecting strut has at least two connection part elements which are connectable to each other. In this connection, this variation also achieves flexibility with regard to the embodiment of the moving truck elements. In this connection, it is possible, for example, to connect a first connecting part element in a fixed or integral manner to the moving body and the second connecting part element in a fixed or integral manner to the articulated ball as the second articulated element. The flexible separation of the moving truck elements is consequently effected inside the connecting strut. The connection is particularly advantageous when the securing of the releasable connection is effected by means of a quick acting closure or preferably by means of a locking connection. Consequently, on the one hand, the assembly of the moving truck arrangement can be effected in a simple and rapid manner by joining the individual components. On the other hand, a change in the moving truck arrangement is also possible with no further expenditure by separation at the releasable connection. Consequently, it is possible to react flexibly to a changing requirement inside the transport apparatus.

For realizing a drive, it is advantageous when at least one friction belt drive or friction wheel drive which engages in the guide track is arranged. In this connection, driving surfaces are provided where necessary on the moving truck elements. The drive elements of the friction belt drive or of the friction wheel drive can bring about the necessary force transference in this connection by means of a friction drive. Consequently, a movement that is both pulling and pushing is possible with regard to the moving truck arrangement.

As an alternative to this, it is particularly advantageous for realizing a drive when at least one toothed belt drive or toothed wheel drive which engages in the guide track is arranged. In this connection, corresponding driving surfaces are also to be provided on the moving truck elements. The drive elements of the toothed belt drive or of the toothed wheel drive can bring about the necessary force transference in this connection by means of a toothed drive. Consequently, a movement that is both pulling and pushing is possible with regard to the moving truck arrangement.

For avoiding additional loading of the bearing arrangement of the moving truck arrangement inside the guide track, it is particularly advantageous when two friction belt drives or friction wheel drives or toothed belt drives or toothed wheel drives are provided arranged symmetrically with respect to the guide track. The opposing arrangement of the drives essentially eliminates transverse forces onto the moving truck elements brought about by the drive. In this connection, it is particularly advantageous when the drive plane defined by the two drives is arranged aligned with the center longitudinal axis of the guide track or moving truck elements.

It is obvious that depending on the development of the guide track, in particular with regard to the length, a different number of drives can be necessary or sensible. In this connection, it can be sufficient from time to time to provided an individual drive or an individual pair of drives. It can also occur that a plurality of pairs of drives are to be used. The number will be oriented in this respect, on the one hand, to the length of the guide track, additionally to the number and length of the individual moving truck arrangements and to the geometrical development of the guide track.

The use of at least two independently controllable drives is particularly advantageous, as a result of which it is made possible that a moving truck arrangement is accelerated or braked to different speeds over the development of the guide track. In this respect, it is possible, for example, to select a lower speed over curves than on long straight stretches.

For transmitting the necessary driving force from the friction belt drive or friction wheel drive/toothed belt drive or toothed wheel drive onto the individual moving truck elements, it is particularly advantageous when the friction belt or the friction wheel/toothed belt drive or toothed wheel drive is elastically mounted as a drive element perpendicularly with respect to the guide track. In this respect, an elastic force can be applied to the driving point and the necessary friction force or a more secure engagement of the teeth can be ensured.

In an advantageous manner, for this purpose, the driving surfaces of the drive elements are realized as keyways in the case of a friction belt drive or a friction wheel drive.

When using a toothed belt drive or toothed wheel drive, it is particularly advantageous when at least one toothed rod portion is arranged on the connecting strut. This consequently ensures that the moving truck arrangement is propelled over a path—even if restricted—by means of the toothed belt drive or the toothed wheel drive. In addition, it is advantageous when the toothed rod portion of the connecting strut continues on the moving body.

The following paragraphs summarize the preferred aspects of this invention with reference to the figures:

(1) A transport apparatus (01, 101, 201) is disclosed for conveying in particular pellet-like products, in particular pharmaceutical products, said transport apparatus having a guide track (03) and a drivable moving truck arrangement (15) which is arranged on the guide track (03) and has at least two moving truck elements (16, 17) which each have a connecting strut (35, 36), on the first end of which is arranged at least one moving body (21, 121, 221) which is guided in a sliding or rolling manner along the guide track (03), characterized in that the moving body (21, 121, 221) has a first articulated element (26) and the second end of the connecting strut (35) has a second articulated element (37), wherein the first articulated element (26) of a first of the two moving truck elements (16, 17) and the second articulated element (37) of the second of the two moving truck elements (16) are connectable together in an articulated manner.

(2) The transport apparatus (01, 101, 201) as disclosed in paragraph (1), characterized by at least one double moving truck element (17) having a connecting strut (36), at the two ends of which at least one moving body (21, 121, 221) is arranged, wherein at least one moving body (21, 121, 221) has a first articulated element (26) which is connectable in an articulated manner to the second articulated element (37) of another moving truck element (16).

(3) The transport apparatus (01, 101, 201) as disclosed in paragraph (2), characterized by at least one connecting moving truck element having a connecting strut, on the two ends of which a second articulated element (37) is arranged, said second articulated elements being connectable to the first articulated elements (26) of two other moving truck elements (16, 17).

(4) The transport apparatus (01, 101, 201) for conveying in particular pellet-like products, in particular pharmaceutical products, said transport apparatus having a guide track (03) and a drivable moving truck arrangement (15) which is arranged on the guide track (03) and has at least two moving truck elements (16, 17) which each have a connecting strut (35, 36), on the first end of which is arranged at least one moving body (21, 121, 221) which is guided in a sliding or rolling manner along the guide track (03), characterized in that at least two moving truck elements are realized as double moving truck elements (17) which have a moving body (21, 121, 221) at both ends of the connecting strut (36) each with a first articulated element (26), wherein the moving truck arrangement (15) additionally includes at least one connecting moving truck element which has a second articulated element (37) at both ends of the connecting strut, wherein the first articulated element (26) of a double moving truck element (17) is connectable to the second articulated element (37) of the connecting moving truck element in an articulated manner.

(5) The transport apparatus (01, 101, 201) as disclosed in any one of paragraphs (1) to (4), characterized in that the moving body (21, 121, 221) has at least three, in particular four, rotatably mounted rollers (22, 23, 24, 122, 222) which are arranged on the periphery.

(6) The transport apparatus (01, 101, 201) as disclosed in paragraph (5), characterized in that at least one of the rollers (24) is mounted elastically on the moving body (21, 121, 221).

(7) The transport apparatus (01, 101, 201) as disclosed in any one of paragraphs (1) to (6), characterized in that the guide track (03) is realized in the form of a guide rail (05, 105, 205) which is slotted substantially over the entire length thereof, wherein the moving truck arrangement (15) is arranged with the moving bodies (21, 121, 221) and connecting struts (35, 36) inside the guide rail (05, 105, 205), wherein at least one moving truck element (16, 17) has at least one load carrier (45, 145, 245), which is arranged in particular substantially perpendicularly with respect to the center longitudinal axis (19, 219) of the moving truck element (16, 17) and protrudes through the slot (07, 107, 207) out of the guide rail (05, 105, 205).

(8) The transport apparatus (01, 101, 201) as disclosed in paragraph (7), characterized in that a guide element is arranged on the load carrier (45, 145, 245), by way of which guide element the load carrier (45, 145, 245) is guided in the slot (07, 107, 207) of the guide rail (05, 105, 205).

(9) The transport apparatus (01) as disclosed in paragraph (7) or (8), characterized by at least one, preferably shell-like or basket-like product carrier (61) which is fastenable on the load carrier (45) of at least one moving truck element (16, 17).

(10) The transport apparatus (01) as disclosed in paragraph (9), characterized in that the product carrier (61) is linked by way of two articulated struts (62, 63) to each load carrier (45) of a moving truck arrangement (15) in such a manner that the articulated linking of the articulated struts (62, 63) makes possible a pivoting movement between the load carrier (45) and the articulated strut (62, 63) and a pivoting movement between the articulated strut (62, 63) and the product carrier (61).

(11) The transport apparatus (01, 101, 201) as disclosed in any one of paragraphs (1) to (10), characterized in that the first articulated element (26) of the moving body (21, 121, 221) is realized as a ball accommodating means and the second articulated element (37, 237) is realized as an articulated ball, wherein the two articulated elements (26, 37, 237) form a ball-and-socket joint which makes it possible for the two connected moving truck elements (16, 17) to pivot and/or rotate toward each other.

(12) The transport apparatus (01, 101, 201) as disclosed in paragraph (11), characterized in that the ball accommodating means is formed by a ball cup (29, 229) and at least one ball sleeve portion (33, 233), wherein the ball cup (29, 229) is arranged in a first component (28, 228) of the moving body (21, 121, 221), in particular of a moving body half, arranged on the side of the connecting strut (35, 36), and the ball sleeve portion (33, 233) is arranged on a second component (32, 232) of the moving body (21, 121, 221), in particular a moving body quarter.

(13) The transport apparatus (01) as disclosed in paragraph (12), characterized in that the parting plane between the first (28) and second component (32) or between the ball cup (29) and the ball sleeve portion (33) lies perpendicularly with respect to a center longitudinal axis (19) of the moving truck element (16, 17).

(14) The transport apparatus (01) as disclosed in paragraph (12) or (13), characterized in that the ball cup (29) is realized substantially at the front end in the form of a contact face for the articulated ball (37) of the adjacent moving truck element (16) to be connected in each case in an articulated manner and the ball sleeve portion (33) is fastened to the first component (28) thereby encompassing the articulated ball (37).

(15) The transport apparatus (01) as disclosed in any one of paragraphs (12) to (14), characterized in that the ball cup (29) is mounted resiliently in the first component (28) and is pressed onto the articulated ball (37) of the following moving truck element (16).

(16) The transport apparatus (201) as disclosed in paragraph (12), characterized in that the parting plane between the first (228) and second component (232) or between the ball cup (229) and the ball sleeve portion (233) lies in a center longitudinal axis (219) of the moving truck element.

(17) The transport apparatus (01) as disclosed in any one of paragraphs (1) to (16), characterized in that the moving body (21) and/or the second articulated element (37) is fastened to the connecting strut (35, 36) in a releasable manner, in particular by means of a quick acting closure or preferably a locking connection (40).

(18) The transport apparatus as disclosed in any one of paragraphs (1) to (17), characterized by at least one friction belt drive or friction wheel drive which engages in the guide track (03), the drive elements of which bring about a friction drive of the moving truck arrangement via driving surfaces arranged on the moving truck elements.

(19) The transport apparatus (01) as disclosed in any one of paragraphs (1) to (17), characterized by at least one toothed belt drive (52) or toothed wheel drive which engages in the guide track (03), the drive elements (54) of which bring about a toothed drive of the moving truck arrangement (15) via driving surfaces (43) arranged on the moving truck elements (16, 17).

(20) The transport apparatus as disclosed in paragraph (16) or (17), characterized in that at least two drives arranged symmetrically with respect to the guide track (03) are provided.

(21) The transport apparatus (01) as disclosed in any one of paragraphs (18) to (20), characterized in that the friction belt or the friction wheel or the toothed belt (54) or the toothed wheel is elastically mounted perpendicularly with respect to the guide track (03).

FIG. 1 outlines an exemplary embodiment of a transport apparatus 01 according to the invention. In this connection, just one portion of the entire transport apparatus 01 can be seen for clarification. In this connection, this is a corner region where the guide track changes from a horizontal into a vertical. The different segments 09 of the guide track 03 or guide rail 05 can be seen, with a horizontal track portion 09a, a vertical track curve 09c and a vertical straight-line track portion 09b. The guide track 03 continues in a corresponding manner on both sides. The moving truck arrangement 15 is situated (not visible) mounted in the guide track 03. The load carriers 45 protrude downward or in the vertical portion to the right from said moving truck arrangement 15 out of the guide track 03. In this connection, the diagram shows, for example, how a product carrier 61 is mounted. A quick acting closure articulated connection 64 is mounted in each case on two spaced apart load carriers 45. The first articulated strut 62 and the second articulated strut 63 connect, in turn, to said quick acting closure articulated connection. In this connection, both articulated struts 62, 63 are realized in each case in the form of a bracket. It can be considered in addition that the articulated struts 62, 63, in turn, are mounted in an articulated manner on the product carrier 61. In this respect, the product carrier 61, as can be seen from the two different positions, is able to pivot down freely on the articulated struts 62, 63 and in each case assume the horizontal. Consequently, the secure conveying of products in the product carrier 61 is ensured. The carrier pivot lever 65 connected to the product carrier 61 can also be seen, by means of which carrier pivot lever the contents of the product carrier 61 can be pivoted out via, for example, a connecting link guide or a corresponding drive.

Figure 2:
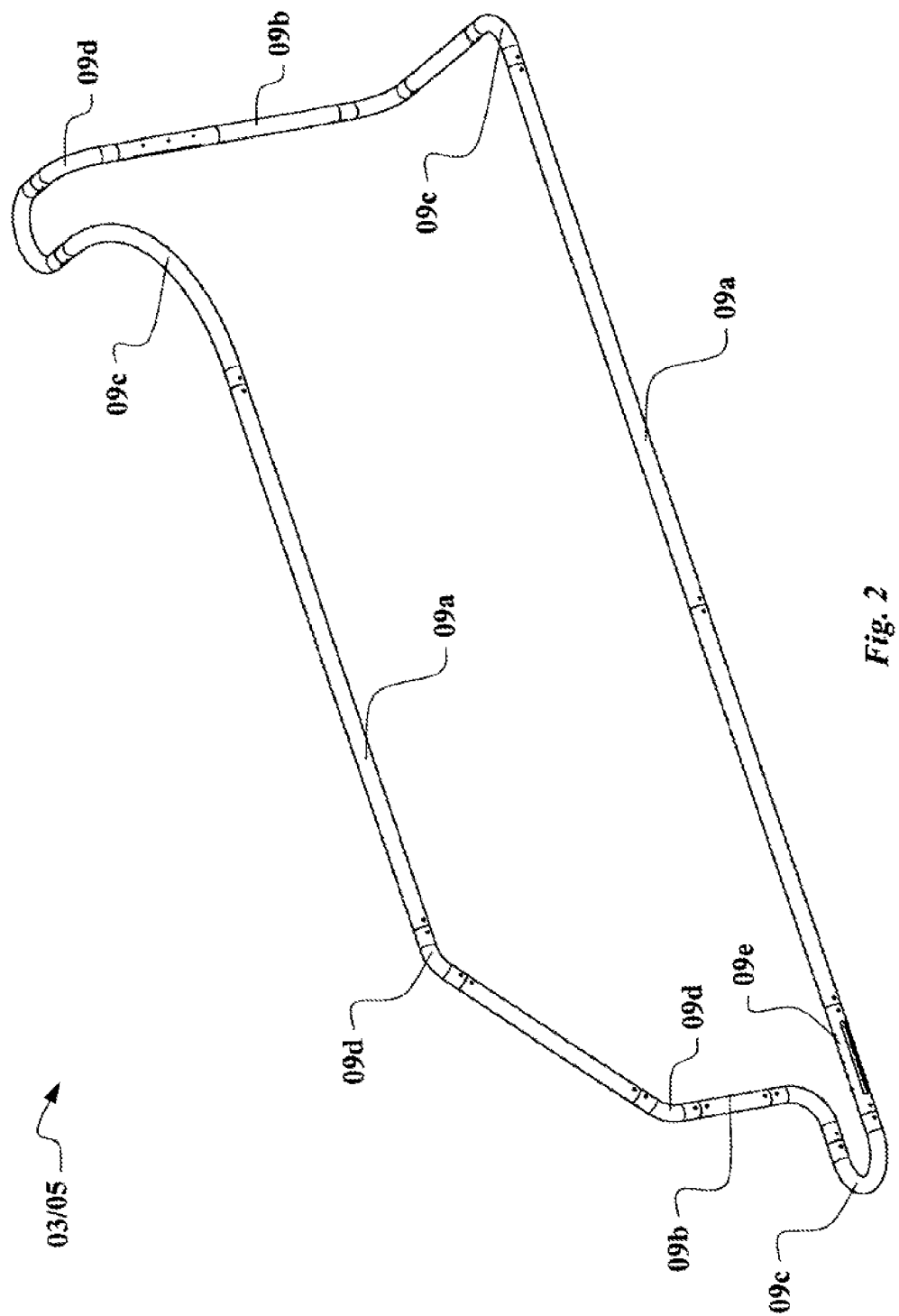
FIG. 2 shows an exemplary development of the guide track 03 for a transport apparatus 01 according to FIG. 1.

FIG. 2 outlines a possible development of the guide track 03 as an example. In this connection, the guide rail 05 used in the transport apparatus 01 has several rail segments 09 which (as can be seen) have not only both horizontal portions 09a and horizontal curved portions 09c, but rather also vertical straight-line portions 09b or inclinedly extending portions or vertical curved portions 09d. It can also be seen that in the region shown on the bottom left, there is a slotted segment piece 09e. Said drive segment 09e serves for mounting a corresponding drive arrangement 51 for the feed movement of the moving truck arrangement 15.

Figure 3:
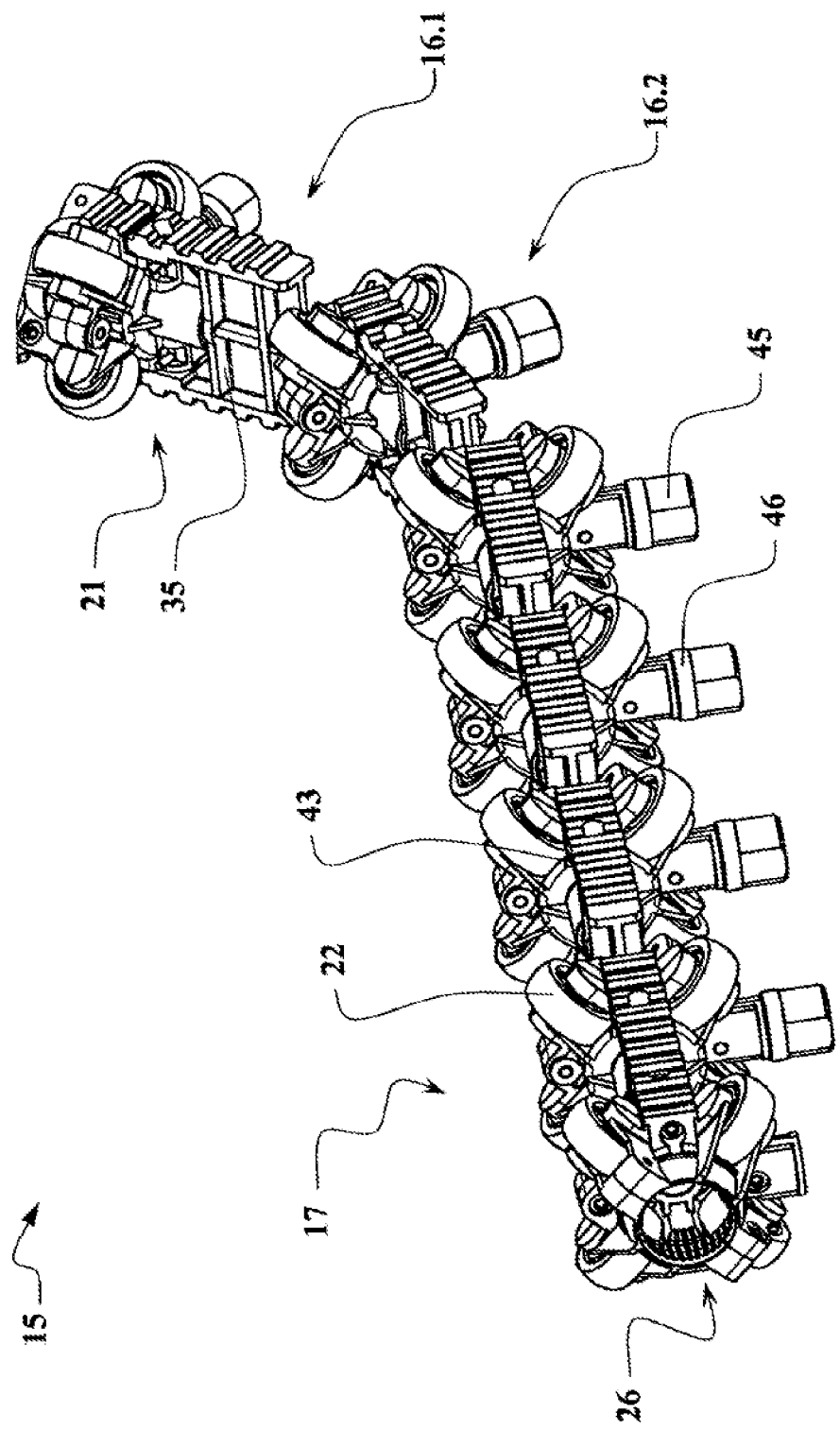
FIG. 3 shows an exemplary moving truck arrangement 15 for the transport apparatus 01 according to FIG. 1.

In FIG. 3, an exemplary embodiment of a moving truck arrangement 15 can now be seen. Said moving truck arrangement consists in the present case of five regular moving truck elements 16 and one double moving truck element 17 at the end shown on the left. Each of the regular moving truck elements 16, in this connection, has a moving body 21, which, in turn, has four rollers 22 distributed on the periphery. In contrast, for the stability of the moving truck arrangement 15 inside the guide track 03, the double moving truck element has two moving bodies 21. Also to be seen is the possible three-dimensional development or the mobility of the moving truck arrangement 15 by means of the articulated connection between the individual moving truck elements 16, 17. Additionally to be seen (at the front end of the moving truck arrangement 15) is the first articulated element 26 present in the moving body 21 in the form of a ball accommodating means and on both sides of all the moving truck elements 16, 17 the toothed rods 43 for the drive of the moving truck arrangement 15. A load carrier 45 with a guide roller 46 located thereon is present on each moving truck element 16, 17. It is obvious how the moving truck arrangement 15 lies with the moving truck elements 16, 17 inside the guide track 03 and in this connection only the load carriers 45 protrude out of the guide rail 05.

Figure 4:
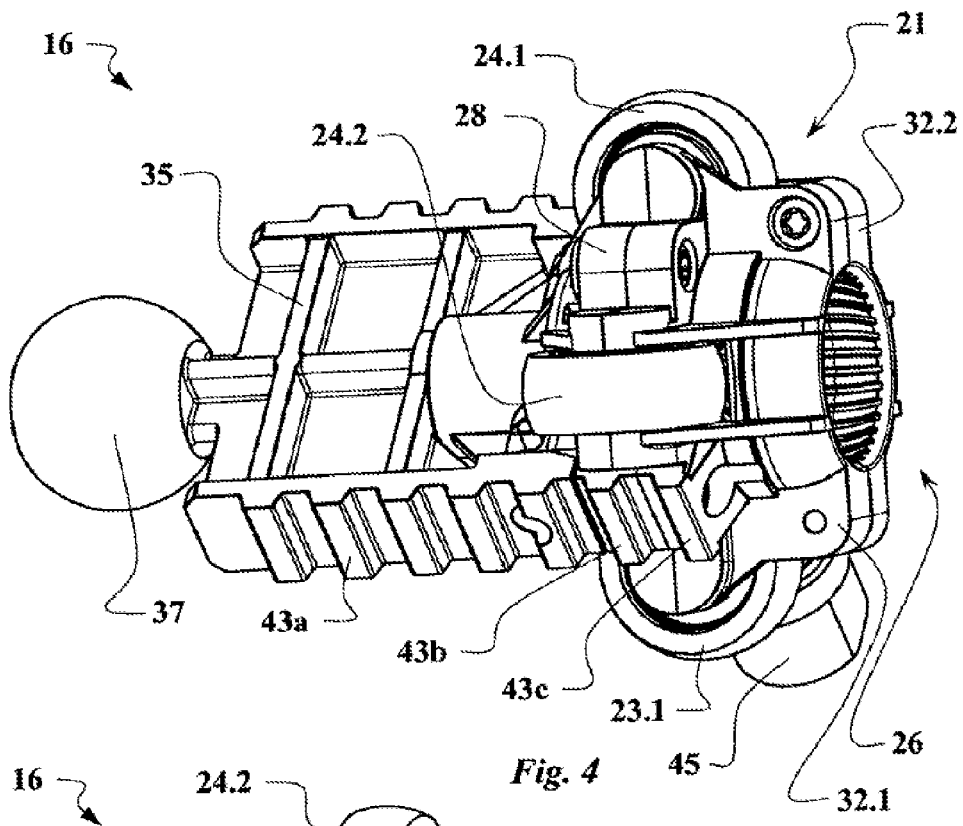
FIG. 4 shows a perspective view of a moving truck element 16 of the moving truck arrangement 15 for the transport apparatus 01.

FIG. 4 outlines a perspective view of an advantageous embodiment of a moving truck element 16 for the transport apparatus 01. The fundamental design of the moving truck element 16 with first of all the moving body 21, the connecting strut 35 and the second articulated element or the articulated ball 37 can be seen. It can also be seen that in said embodiment the moving body 21 is built up of multiple parts and in this connection is formed from a first component or the moving body half 28 and two times a second component or in each case the moving body quarter 32.1 and 32.2. The first articulated element 26 in the form of a ball sleeve can be seen inside the moving body, in the manner of an attachment. Additionally shown are the rollers 22, the bottom rollers forming fixed rollers 23.1 and 23.2 (Note: fixed relates to the rotational axis) and the top rollers being realized as resiliently mounted rollers 24.1 and 24.2. In this design, the resilient bearing arrangement relates to the fact that the rollers 24 are able to deflect in the direction of the center longitudinal axis 19 of the moving truck element 16 when the rollers 24 are loaded when abutting against the guide track 03. In relation to this, it does not forcibly have to be an arrangement of, for example, a compression spring or the like, but rather elastic suppleness in the bearing position is sufficient. It is also conceivable in the simplest case to realize the suppleness by means of an elastic embodiment of the actual rollers. Also to be seen is the toothed rod 43 arranged on both sides of the moving truck element 16 consisting in each case of the three part portions on the connecting strut 43a, on the moving body half 43b and on the moving body quarter 43c.

Figure 5:
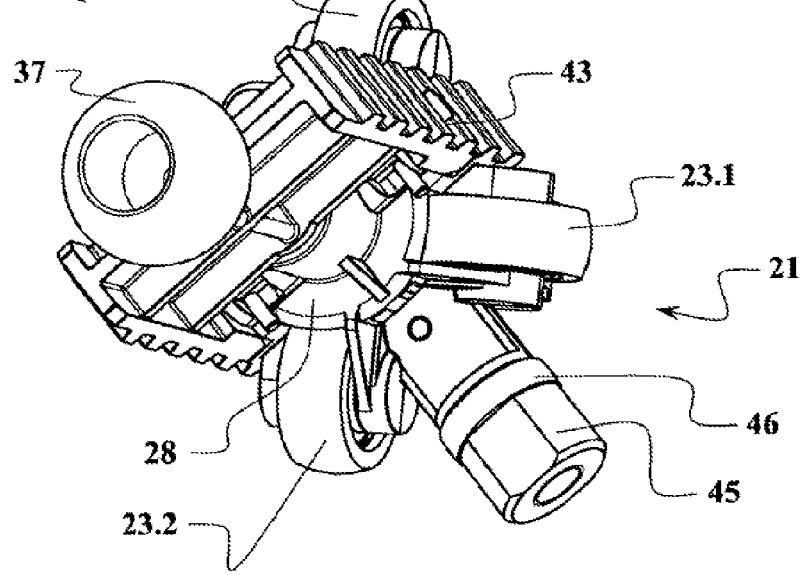
FIG. 5 shows a further perspective view of the moving truck element 16.

FIG. 5 shows a further perspective view of the moving truck element 16. In this connection, advantageously to be seen is the load carrier 45, on which the guide roller 46 is mounted. In this connection, the load carrier 45 is arranged below the moving body 21 and is fixedly connected to same 21.

Figure 6:
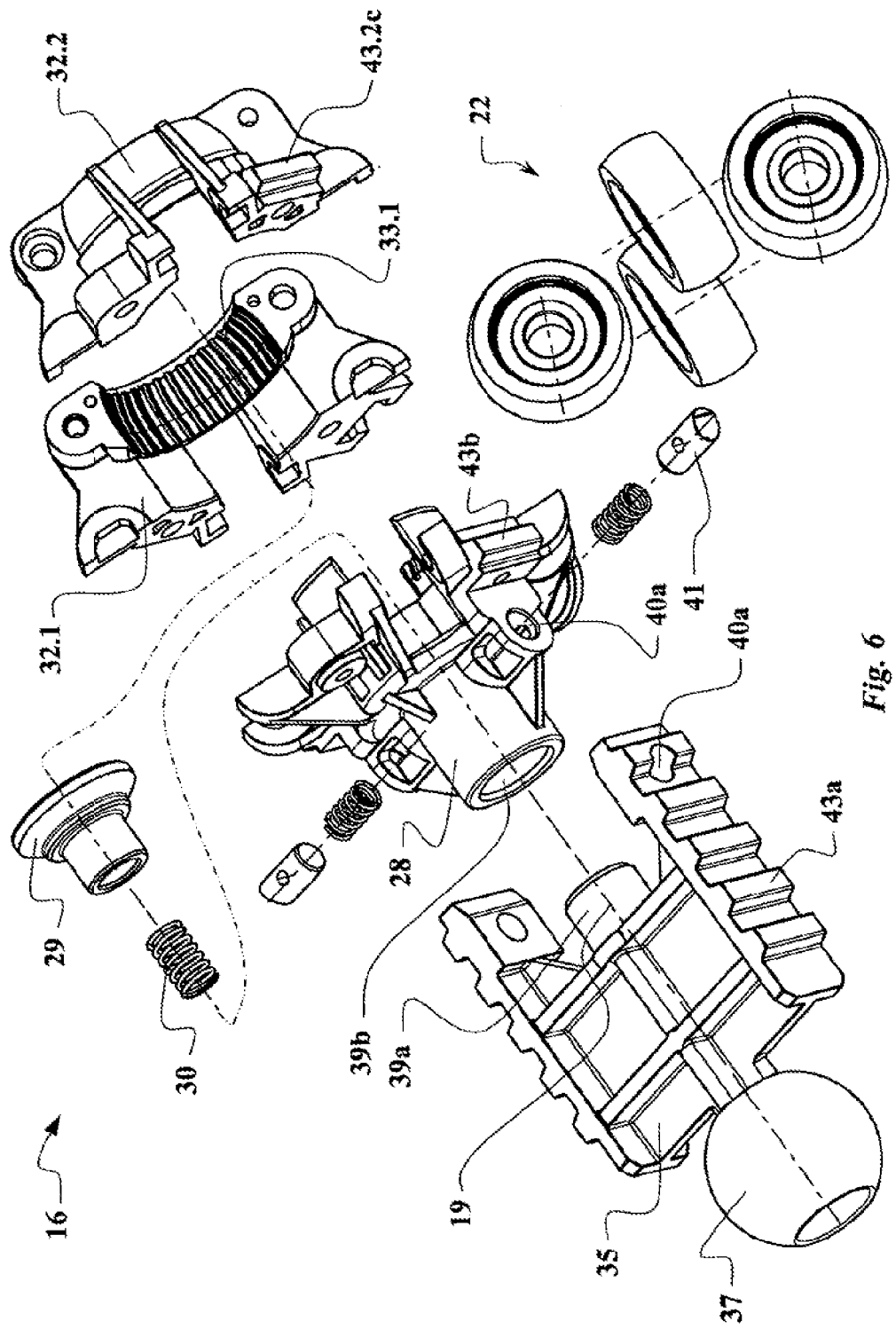
FIG. 6 shows an exploded view of the moving truck element 16.

The modular design of the moving truck element 16 is obvious in a particularly advantageous manner in FIG. 6. To be seen is the single-part embodiment of the connecting strut 35 with the connected second articulated element or the articulated ball 37. It can additionally be seen that the connecting strut 35 has the toothed rod portion 43a on both sides. In the connection to the moving body 21, the connecting strut 35 has a base 39a of a plug-in connection. In addition, recesses 40a for a locking connection serve for securing the plug-in connection. In a complementary manner to this, the first component of the moving body or the moving body half 28 has a sleeve 39b for the plug-in connection. In addition, on both sides in the moving body half 28, a resiliently mounted locking bolt 41 is mounted in the accommodating means 40a for the locking connection. Consequently, the advantageous, simple connection between the moving body 21 and the connecting strut is obvious. In this respect, to assemble the connecting strut 25 on the moving body 21, all that is required is a plug and lock operation.

The multi-part design of the moving body with the moving body half 28 and the two moving body quarters 32.1 and 32.2 can be advantageously seen. In this connection, the moving body quarters 32.1 or 32.2 each have a ball sleeve portion 33.1 and 33.2 (not visible). The ball cup 29 provided in said embodiment is mounted for this purpose in a resilient manner by means of the spring element 30 inside the first component or the moving body half 28. Consequently it is obvious that when the moving body 21 is joined together, the first articulated element 26 is formed and a second articulated element or an articulated ball 37 of a following moving truck element is encompassed. Play inside the articulated connection is eliminated by means of the spring element 30.

Additionally advantageous in the case of this embodiment is the arrangement of the rollers 22 with the axes thereof in the parting plane between the moving body half 28 and the moving body quarters 32. In this respect, when the moving body quarters 32 are assembled onto the moving body half 28 thus encompassing the articulated ball 37 of the following moving truck element, the rollers 22 are mounted at the same time. It can be considered that the parting plane between the first component or the moving body half 28 and the second component or the moving body quarters 32 does not have to be a geometric plane, but rather can have shoulders and gaps, as long as is ensured that when the moving body 21 is assembled with the articulated ball 37 accommodated in the first articulated element 26, the rollers are mounted at the same time.

Figure 7:
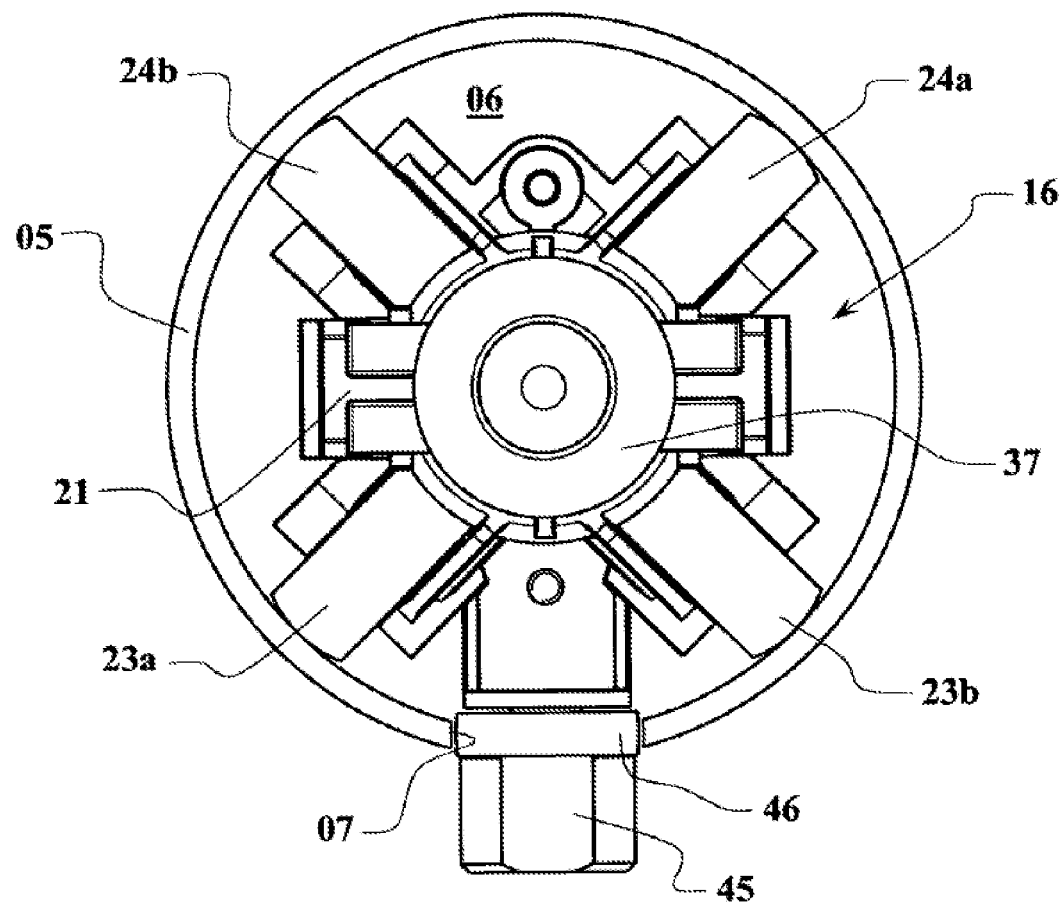
FIG. 7 shows a view in the longitudinal direction of the center axis onto a moving truck element 16 in the guide rail 05 for the embodiment according to FIG. 1.

To clarify the position of the moving truck arrangement or of the moving truck element 16 inside the guide track or the guide rail 05, FIG. 7 outlines a regular moving truck element 16 inside the guide rail 05. The bearing arrangement of the moving truck element 16 by means of the moving body 21 inside the guide cross section 06 can be seen. In this connection, the two fixed rollers 23a, 23b and the two resiliently mounted rollers 24a and 24b roll inside the guide rail 05. The articulated ball 37 as the second articulated element of the moving truck arrangement 16 is situated in the center. It can also be seen how the load carrier 45 penetrates the guide rail 05 in the region of the slot 07. For a better bearing arrangement and for avoiding sliding friction, a guide roller 46 is attached on the load carrier 45 in a rotatably mounted manner. It is obvious how the rotational position of the moving truck element 16 about the center longitudinal axis 19 is defined by the assignment of the guide roller 46 inside the slot 07.

Figure 8:
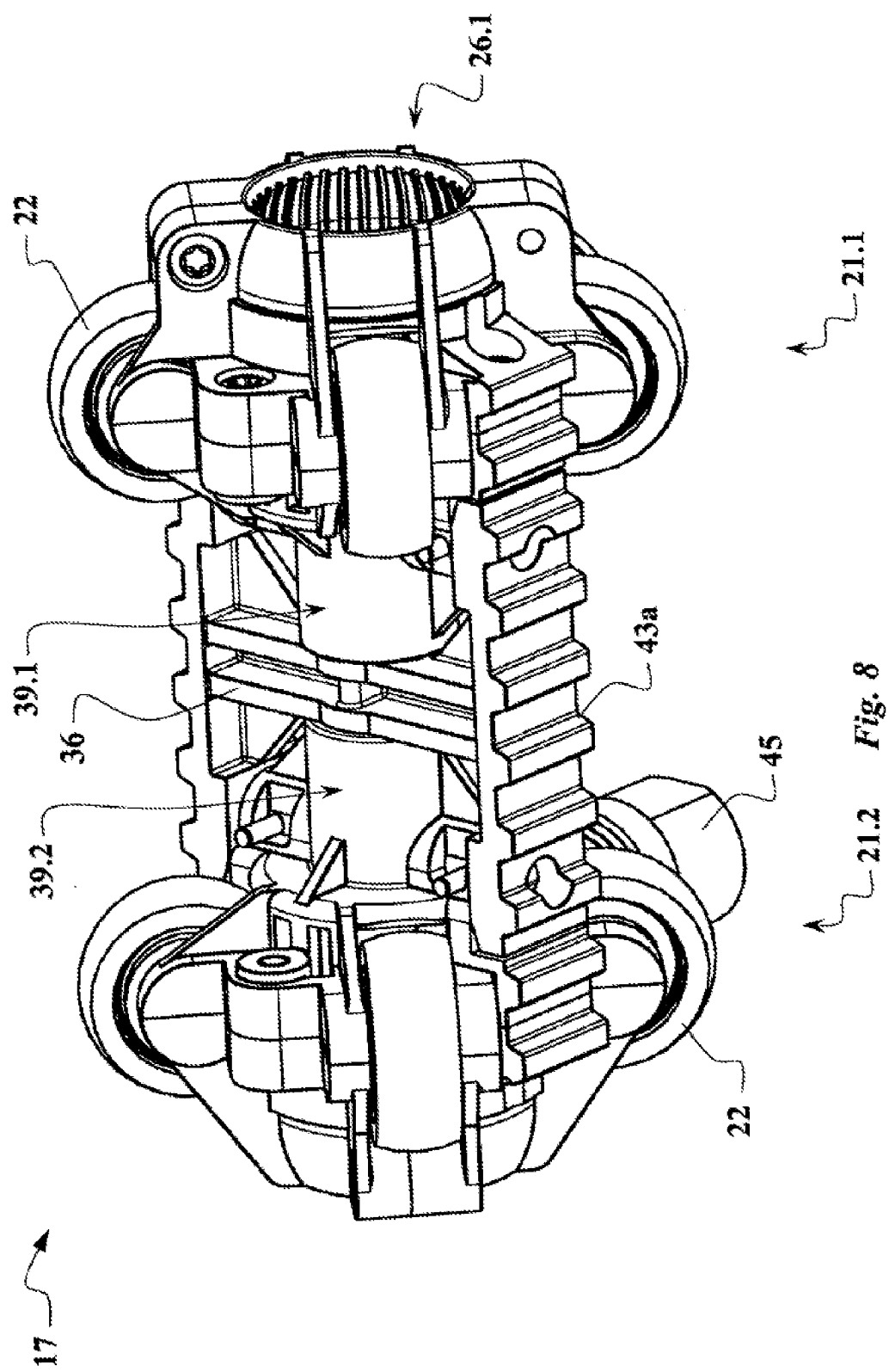
FIG. 8 shows a perspective view of a double moving truck element 17.

FIG. 8 outlines a double moving truck element 17 as a supplementary element inside the transport apparatus 01. Said double moving truck element has a design that is initially comparable to the regular moving truck element 16. In this respect, there is also on the first side a first moving body 21.1, which has corresponding rollers 22 and a first articulated element 26.1. Connected to this with the same type of plug-in connection 39.1 is a double connecting strut 36. Said double connecting strut, just as the regular connecting strut 35, has the toothed rod portion 43a. Contrary to the regular embodiment of the moving truck element 16, now in the case of said double moving truck element 17 a second moving body 21.2 is arranged at the second end. Said second moving body is advantageously realized in a substantially identical manner to the first moving body 21.1 and is connected to the double connecting strut 36 with the same plug-in connection 39.2. Initially insignificant in this connection is that only one moving body 21.2 has a load carrier 45, whilst in contrast the other moving body 21.1 does not include same.

Figure 9:
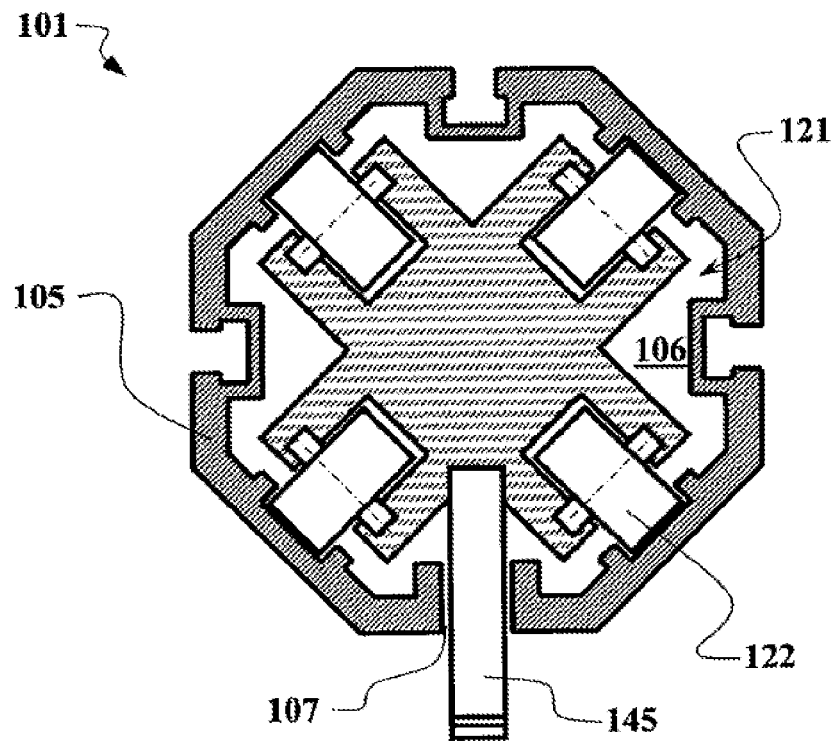
FIG. 9 shows an alternative embodiment of a transport apparatus 101 with an octagonal profile 105.

FIG. 9 outlines an alternative embodiment of a transport apparatus 101 as an example. Contrary to the embodiment of the transport apparatus 01, in this connection, the guide track has an octagonal guide rail 105. Also as in the case of the embodiment of the transport apparatus 01, a moving body 121 is located inside the guide cross section 106 of the guide rail 105 and abuts against the respective guide faces by way of four rollers 122. Additionally outlined is the load carrier 145, which extends downward through a slot 107 in the guide rail 105.

Figure 10:
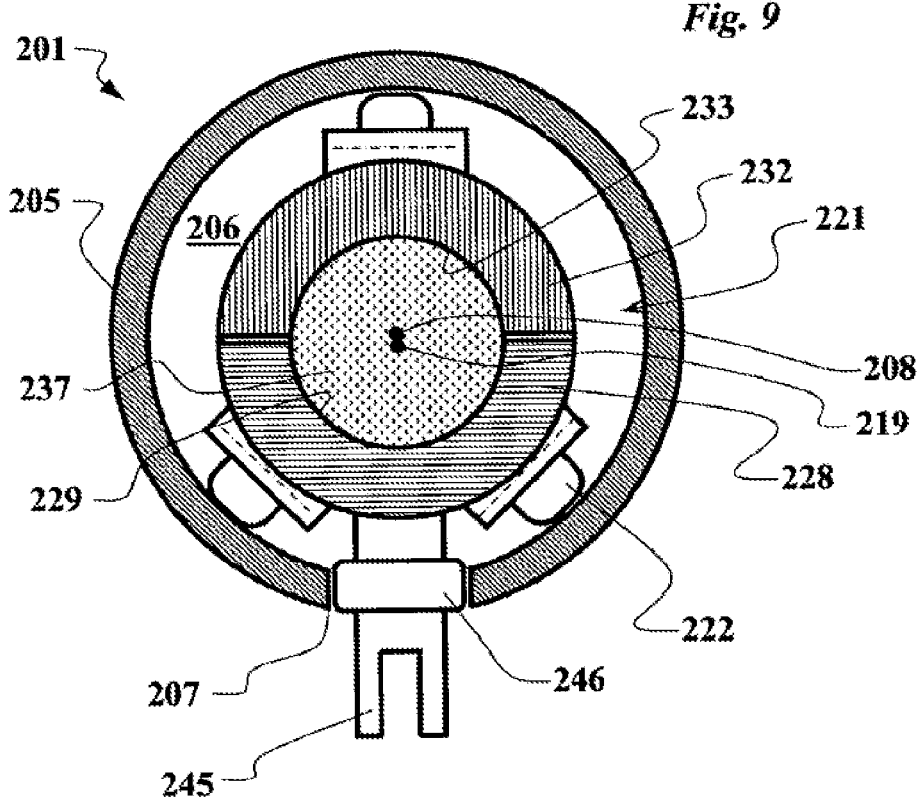
FIG. 10 shows an alternative embodiment of a transport apparatus 201 with three rollers 222.

A further exemplary embodiment of a transport apparatus 201 is outlined in FIG. 10, once again with a circular guide rail 205 in which the moving body 221 is arranged. In this case, the moving body 221 has three rollers 222. Additionally outlined as an example is an alternative parting between the moving body 221 with a first component as moving body bottom part 228 and a second component as moving body top part 232. Said parts encompass the articulated ball 237 or the second articulated element of the following moving truck element by means of the ball cup 229 on the bottom and the ball sleeve portion 233 on the top. Additionally outlined is once again the load carrier 245 with a guide roller 246 which is mounted so as to be rotatable on the load carrier 245 and in this connection is supported inside the slot 207 of the guide rail and consequently predetermines the rotational position of the moving truck element.

Additionally outlined as an example is that the moving body 221 lies inside the guide cross section 206 formed by the guide rail 205, the center point of the guide rail 205 or of the guide cross section 206 as the center axis of the guide rail 208 lying above the center point or the center longitudinal axis 219 of the moving body 221 or of the respective moving truck element. In this respect, it is obvious that the center point of the center axis 208 of the guide rail does not have to be aligned with the center longitudinal axis 219 of the moving truck element. However, with regard to the track guide and the uniform development, it is of particular advantage when the center longitudinal axis 219 of the moving truck element is aligned in an extensive manner with the center axis 208 of the guide rail.

Figure 11:
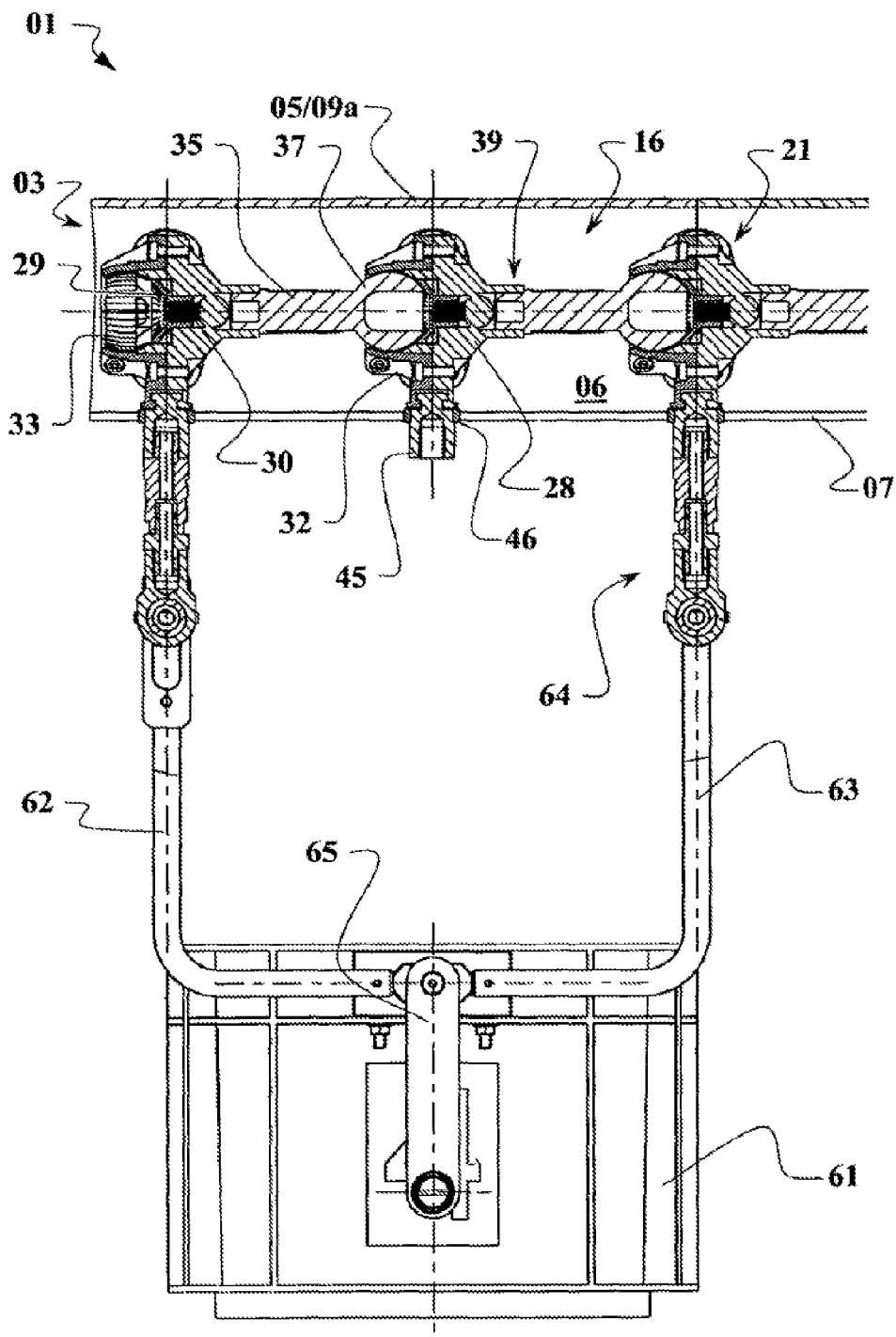

FIG. 11 outlines a vertical section of a horizontal portion of the transport apparatus 01 as an example. The guide rail 05 or the horizontal track portion 09a forming the guide track 03 can first of all be seen. The moving truck arrangement 15 with the outlined moving truck elements 16 lies inside said guide track. In this connection, the assignment of the moving truck elements 16 to each other with the moving bodies 21 and the connecting struts 35 can be seen. In addition, it can be seen how the articulated ball 37 of a moving truck element 16 is encompassed by the articulated element 26 of a following moving truck element 16 with the ball cup 29 and the ball sleeve portion 33. At the bottom of the guide rail 05 is the slot 07 through which the load carrier 45 protrudes. Said load carrier is guided inside the slot 07 by means of a guide roller 46. Connected to the load carrier is a quick acting closure articulated connection 64. Said connection 64 has a quick acting closure on the one side and on the other a multiply movable joint which allows for both rotating and pivoting. In the case of a first moving truck element 16 the first articulated strut 62 connects below the quick acting closure articulated connection 64, and in the case of another moving truck element 16 the second articulated strut 63 connects below the quick acting closure articulated connection 64. Said articulated struts 62, 63 are, in turn, connected in an articulated or pivotable manner to the actual product carrier 61. In this respect, a three-dimensional track movement leads to the product carrier 61 hanging down freely such that same always remains in the horizontal. Said embodiment is supplemented by an advantageous carrier pivot lever 65 which is located in front of the articulated struts 62, 63, but is fixedly connected to the product carrier 61. In this connection, it is possible that the lever action realizes an eccentric drive or, as an alternative, a connecting track guide by means of which the product carrier 61 is pivoted in a controlled manner and consequently tipped up. Consequently, it is possible to empty out material located in the product carrier 61.

Figure 12:
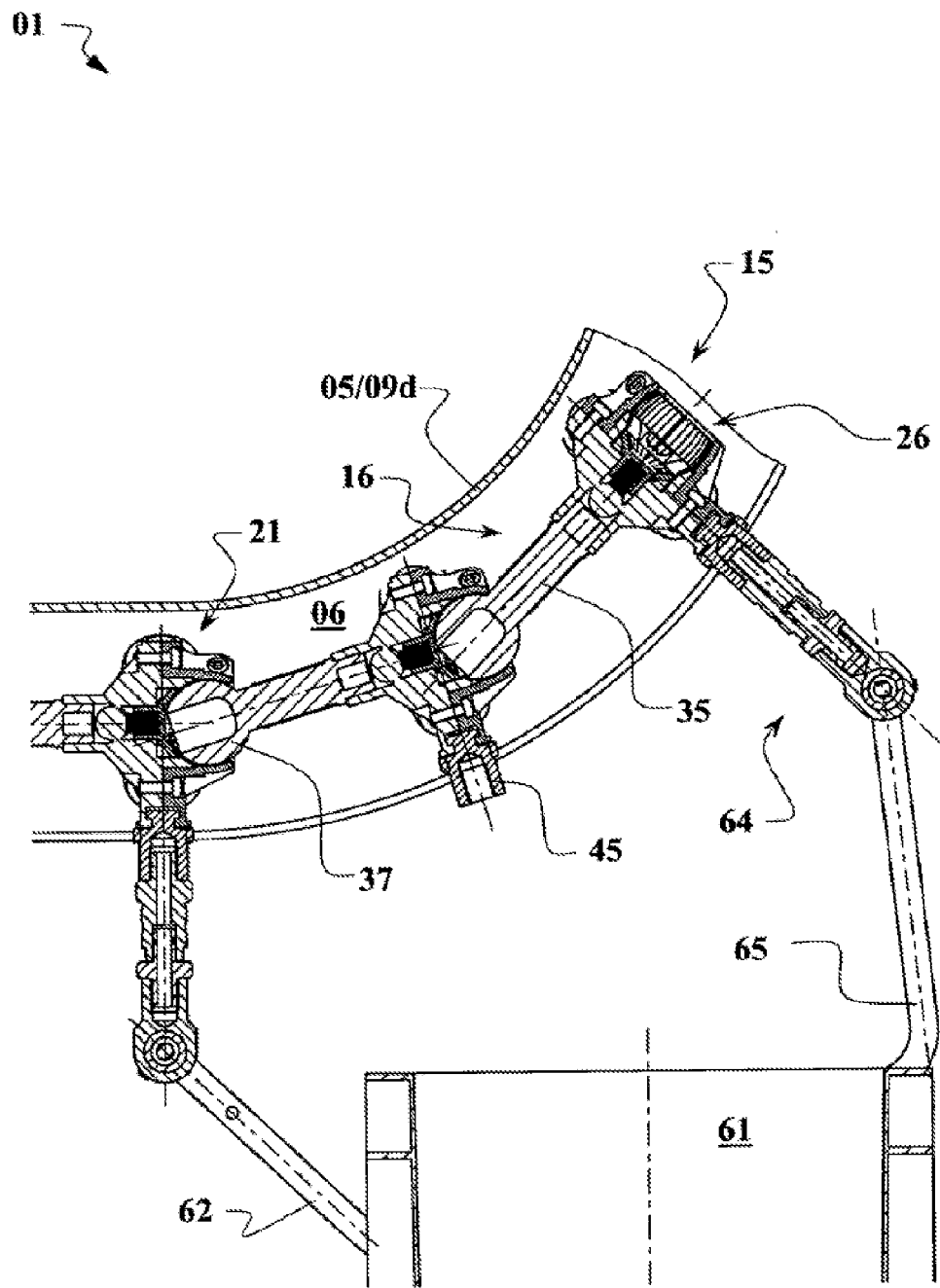
FIG. 12 shows a vertical sectioned representation of a portion of the transport apparatus 01 with a vertical track curve 09d.

Adding to this, FIG. 12 shows a vertical section through a portion of the transport apparatus 01 in a vertical track curve portion 09*d*. In particular, the pivoting of the individual moving truck elements 16 with respect to each other can be seen here, as well as the pivoting of the first and of the second articulated strut 62, 63 in relation to the respective quick acting closure articulated connections 64. It can also be seen that the product carrier 61 remains in the horizontal irrespective of the position in the three-dimensional track development.

Figure 13:
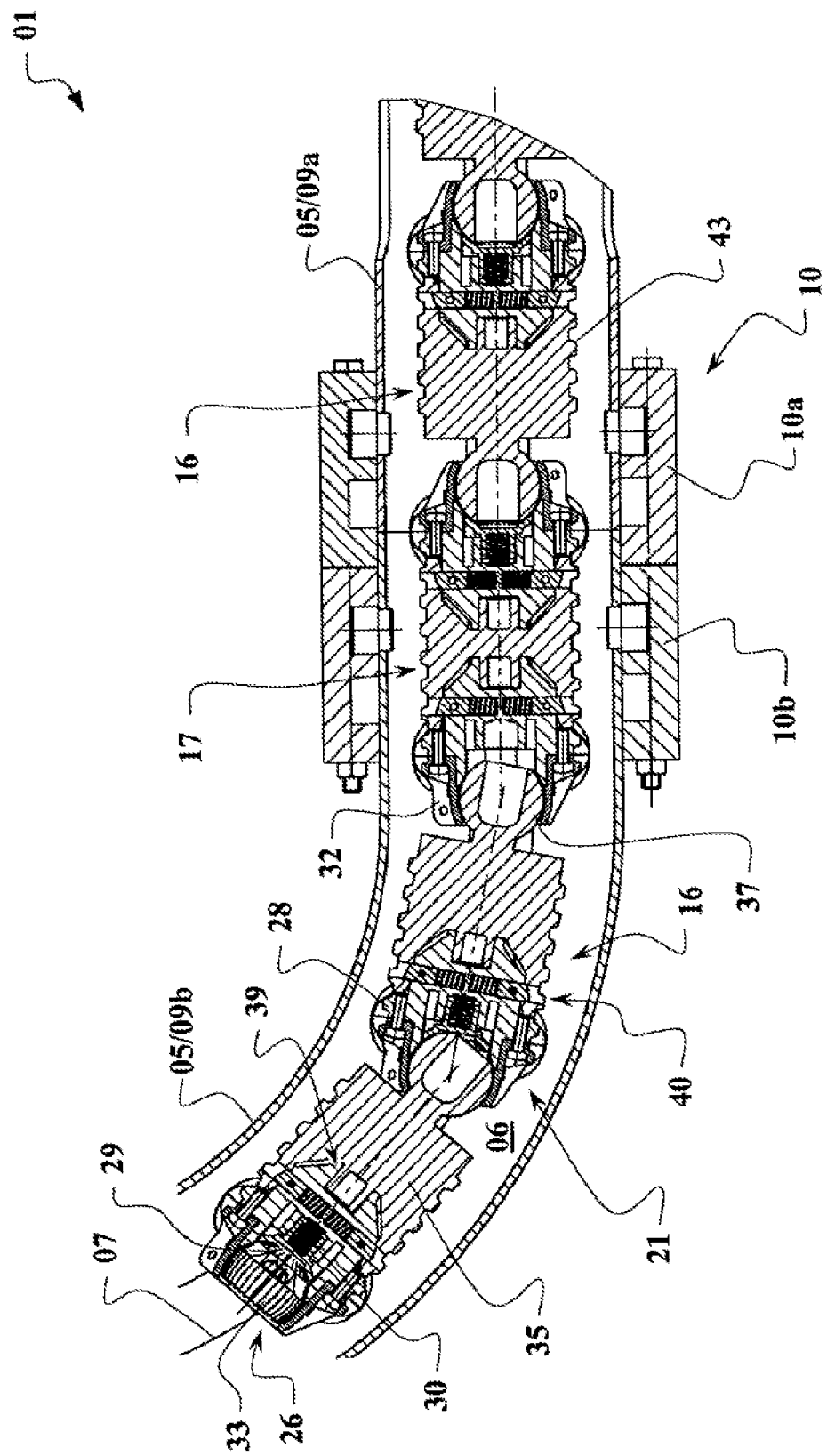
FIG. 13 shows a horizontal sectioned representation of a portion of the transport apparatus 01 with a horizontal track curve 09c.

FIG. 13 outlines, once again, a portion of the transport apparatus 01, this time in a horizontal section. In this connection, firstly once again the development of the guide rail 05 with a horizontal track curve portion 09*c* can be seen. The slot 07 of the guide rail 05 is located below the outlined moving truck arrangement 15. The connection between the individual rail segments 09 is realized by means of a segment connector 10. In this connection, a segment connector half 10*a* or 10*b* is mounted in each case at both ends of the track portions 09*a* or 09*c*. To join the rail segments 09, said segment connector halves 10*a* or 10*b* are screwed together. Also to be seen in said section is the development of the connecting strut 35 with the toothed rods 43 on both sides and the connection to the moving body 21 by means of the plug-in connection 39 and the locking connection 40.

The possibility to use the double moving truck element 17 is outlined in addition in said example. Said double moving truck element is located, in said exemplary embodiment, in the development of the moving truck arrangement 15. In this respect, the regular moving truck elements 16 are connected on both sides aligned in the opposite direction. In the simplest case, the arrangement of the double moving truck element 17 is selected at the beginning or end of a moving truck arrangement 15.

Figure 14:
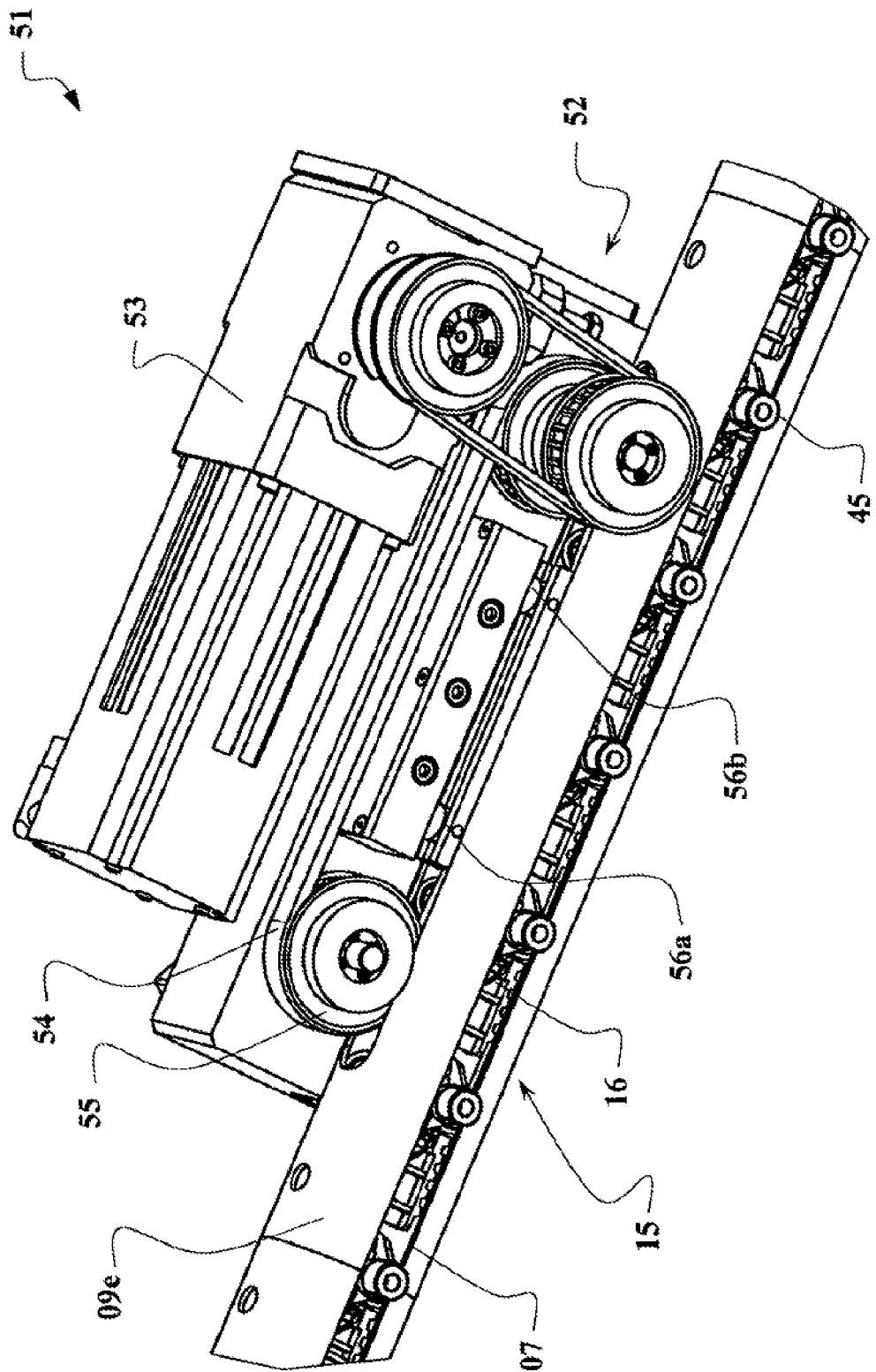
FIG. 14 shows a drive arrangement 51 for the drive of the moving truck arrangements 15 in the application according to the embodiment from FIG. 1.

FIG. 14 outlines, as an example, a drive arrangement 51 for the drive of the moving truck arrangement 15 inside the guide rail 05. Said drive arrangement, in said example, has a toothed belt drive 52 on one side of the guide rail or of the drive segment 09*e* of the guide rail 05. Said toothed belt drive, in turn, is driven by a geared motor 53. The toothed belt drive 52, in this connection, includes a toothed belt 54 (in a simplified representation without teeth) which is guided by two guide rollers 55. By means of the contact rollers 56*a* or 56*b*, the toothed belt is pressed into the toothed rod 43 on the individual moving truck elements and engaged.

Figure 15:
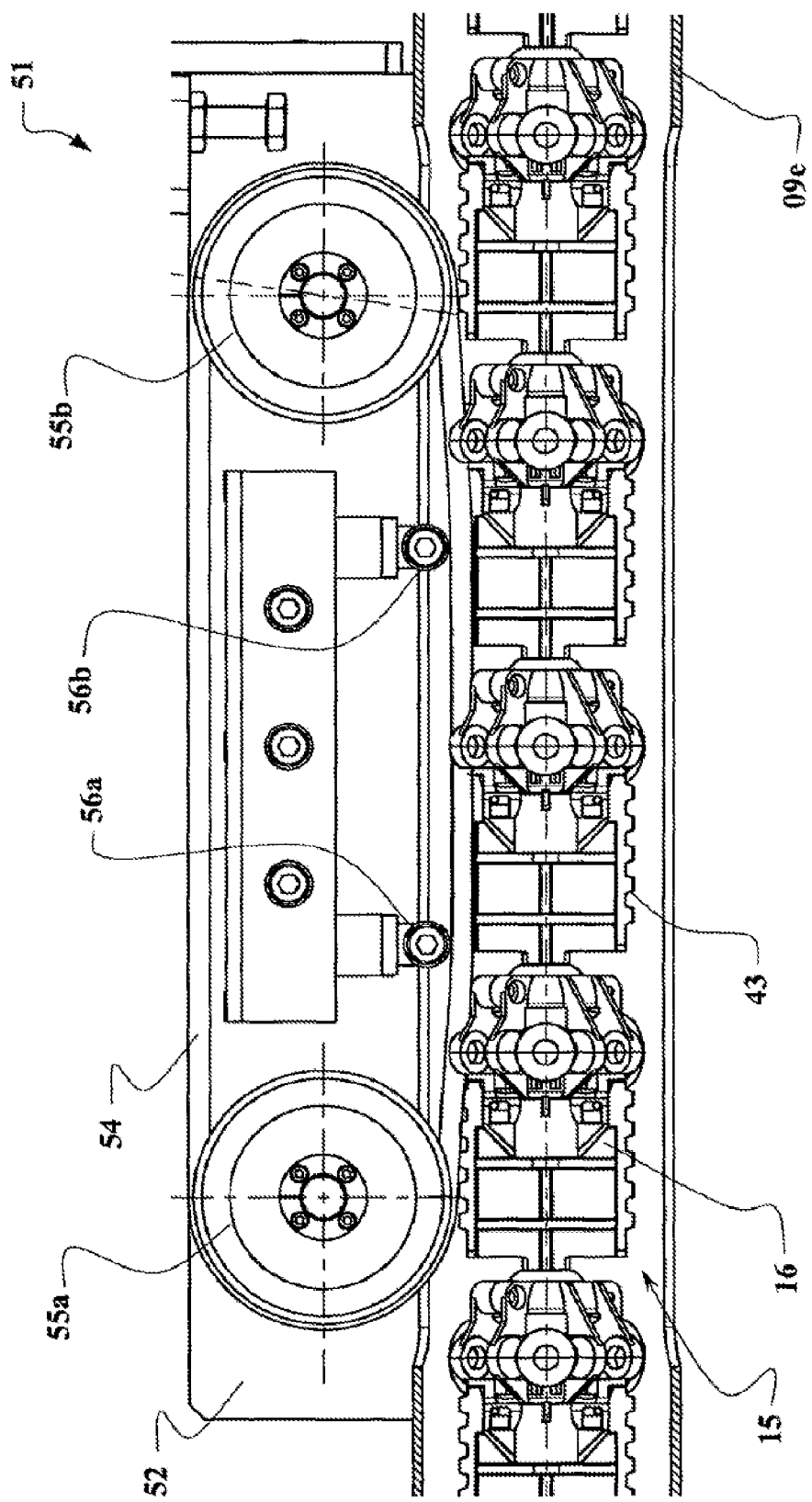
FIG. 15 shows a view in partial section of the drive arrangement 51 supplementing FIG. 14.

FIG. 15, supplementing FIG. 14, shows a partial section of the drive arrangement 51. The moving truck arrangement 15 with the individual moving truck elements 16 can be seen centrally in the guide rail or the drive segment 09*e*. The outer toothed rods 43 of said moving truck arrangement form the corresponding driving surface for the movement of the drive arrangement 51. In this connection, in the case of the toothed belt drive 52, the toothed belt 54 is pressed against the toothed rods 43 by the contact rollers 56*a* and 56*b*. In this connection, the contact rollers 56*a* and 56*b* are resiliently mounted.

FIGS. 16*a* to 16*c* outline the possibility for connecting the individual rail segments 09 as an example. This is effected, in the example, by means of segment connectors 10. Said segment connectors include, in turn, two segment connector halves 10*a* and 10*b*. In each case one segment connector half 10*a* or 10*b* is pre-assembled at each end of a rail segment 09.1 or 09.2. In this connection, the segment connector halves 10*a* or 10*b* encompass the guide rail 05. As a result of the offset of the segment connector half 10*b* at the end of the rail segment 09.2, it is made possible for the rail segments 09.1 and 09.2 to be aligned precisely with each other. In this connection, the segment connector half 10*a* protrudes beyond the rail segment 09.1 and is inserted into the segment connector half 10*b* for assembly. The actual connection between the two segment connector halves is effected by means of screw connections extending parallel to the rail axis. Consequently, a secure connection is obtained in a simple manner without it being possible for alignment errors to occur.

It can also be seen that it is possible to fasten the segment connectors 10 to a framework or the like in the manner of an attachment. The segment connectors 10 are provided in a particularly advantageous manner for this purpose as a level screw-on surface is available thereon.

LIST OF REFERENCES

01 Transport apparatus
03 Guide track
05 Guide rail
06 Guide cross section
07 Slot in guide rail
08 Center axis guide rail
09 Rail segments
09*a* Horizontal track portion
09*b* Vertical track portion
09*c* Horizontal track curve
09*d* Vertical track curve
09*e* Drive segment
10 Segment connector
10*a* Segment connector half
10*b* Segment connector half
15 Moving truck arrangement
16 Moving truck element
17 Double moving truck element
19 Center longitudinal axis
21 Moving body
22 Roller
23 Fixed roller
24 Resiliently mounted roller
26 First articulated element
28 First component of the moving body/moving body half
29 Ball cup
30 Spring element
32 Second component of the moving body/moving body quarter
33 Ball sleeve portion
35 Connecting strut
36 Double connecting strut
37 Second articulated element/articulated ball
39 Plug-in connection—connecting strut to moving body
40 Locking connection—connecting strut to moving body
41 Resiliently mounted locking bolt
43 Toothed rod
43*a* Toothed rod portion on connecting strut
43*b* Toothed rod portion on moving body half
43*c* Toothed rod portion on moving body quarter
45 Load carrier
46 Guide roller
51 Drive arrangement
52 Toothed belt drive
53 Geared motor
54 Toothed belt
55 Guide rollers
56 Contact rollers
61 Product carrier
62 First articulated strut
63 Second articulated strut 64 Quick acting closure articulated connection
65 Carrier pivot lever
101, 201 Transport apparatus
105, 205 Guide rail
106, 206 Guide cross section
107, 207 Slot in guide rail
208 Center axis guide rail
219 Center longitudinal axis
121, 221 Moving body
122, 222 Rollers
228 First component of moving body/moving body bottom part
229 Ball cup
232 Second component of moving body/moving body top part
233 Ball part sleeve
237 Second articulated element/articulated ball
145, 245 Load carrier
246 Guide roller

The invention claimed is:

1. A transport apparatus for conveying goods comprising:
   (a) a guide track and
   (b) a drivable movable truck arrangement arranged on the guide track,
   wherein
   the drivable movable truck arrangement comprises at least two movable truck elements and at least one connecting strut comprising a first end and a second end, wherein the first end and second end of each connecting strut are connected to the movable truck elements located at opposite ends of the connecting struts, wherein each movable truck element comprises
   (1) at least one body having a center longitudinal axis in the direction of movability along the guide track, wherein each body comprises a first articulatable element and
   (2) at least three rollers rotatably mounted on the body at spaced apart locations about the center longitudinal axis of the body;
   wherein
   the second end of the connecting strut comprises a second articulatable element adapted for articulation with the first articulatable element of the body, wherein the first and second articulatable elements are adapted to allow the body and connecting strut to pivot and rotate relative to each other,
   wherein
   the axis of rotation of each roller is tangential to a circumference about the center longitudinal axis of the body and/or
   the first articulatable element is an articulatable ball cup mounted resiliently in the body, the second articulatable element is a ball adapted to articulate with the ball cup, the body further comprises a ball sleeve portion adapted to press the articulatable ball onto the articulatable ball cup and/or
   the transport apparatus further comprises at least one belt drive or wheel drive proximal to the guide track and the movable truck element comprises at least one drive surface adapted to engage the belt drive or wheel drive to bring about a drive of the movable truck arrangement, wherein the belt is a friction belt or toothed belt, the wheel is a friction wheel or toothed wheel, and the belt or wheel is elastically mounted perpendicularly with respect to the guide track.

2. The transport apparatus as claimed in claim 1, wherein at least one movable truck element is a double movable truck element, wherein the at least one body comprises two bodies connected to each other such that the first articulatable elements are located at opposite ends of the movable truck element.

3. The transport apparatus as claimed in claim 2, wherein the first end of at least one connecting strut further comprises a third articulatable element in addition to the second articulatable element of the second end of the connecting strut, wherein the third articulatable element suitable for articulately engaging with the first articulatable element an adjacent movable truck element for allowing the body and connecting strut to pivot and rotate relative to each other.

4. The transport apparatus claimed in claim 3, wherein the drivable movable truck arrangement comprises at least two double movable truck elements.

5. The transport apparatus as claimed in claim 1, wherein each body has at least four rotatably mounted rollers.

6. The transport apparatus as claimed in claim 1, wherein the guide track is a hollow guide rail slotted substantially over the entire length thereof, the bodies and connecting struts are located inside the hollow guide rail, and the transport apparatus further comprises at least one load carrier connected to at least one movable truck element, wherein the at least one load carrier protrudes through the hollow guide rail slot.

7. The transport apparatus as claimed in claim 6, wherein the transport apparatus further comprises a guide element connected to the load carrier and arranged within the hollow guide rail slot for guiding the load carrier through the slot of the hollow guide rail.

8. The transport apparatus as claimed in claim 6, wherein the transport apparatus comprises at least one product carrier fastened on the load carrier of at least one movable truck element.

9. The transport apparatus as claimed in claim 8, wherein each product carrier is fastened to each of two load carriers by way of product carrier struts articulatably linked to the product carrier and articulatably linked to each load carrier of a moving truck arrangement such that the product carrier struts are capable of pivoting movement between the load carrier and the product carrier struts and pivoting movement between the product carrier struts and the product carrier.

10. The transport apparatus as claimed in claim 1, wherein the first articulatable element is a ball cup and the second and third articulatable elements are a ball, wherein the ball and ball cup are joined as a ball-and-socket joint via a ball sleeve portion of the body.

11. The transport apparatus as claimed in claim 10, wherein the first articulatable element further comprises a parting plane between the ball cup and the ball sleeve portion and the parting plane is perpendicular to the center longitudinal axis of the movable truck element.

12. The transport apparatus as claimed in claim 10, wherein the body comprises a first component and a second component, the ball cup is located in the first component, the ball sleeve is located in the second component, and the second component is fastened to the first component, thereby encompassing the articulated ball between the ball cup and the ball sleeve.

13. The transport apparatus as claimed in claim 12, wherein the body further comprises a parting plane between the first and second component, wherein the parting plane is perpendicular to the center longitudinal axis of the body.

14. The transport apparatus as claimed in claim 13, wherein at least two drives arranged symmetrically with respect to the guide track are provided.

15. The transport apparatus as claimed in claim 1, wherein the body and/or the second articulatable element are/is fastened to the connecting strut in a releasable manner.

16. The transport apparatus as claimed in claim 1, wherein the transport apparatus comprises at least one friction belt drive or friction wheel drive which engages in the guide track, the drive elements of which bring about a friction drive of the movable truck arrangement via driving surfaces arranged on the movable truck elements.

17. The transport apparatus as claimed in claim 1, wherein the transport apparatus comprises at least one toothed belt drive or toothed wheel drive which engages in the guide track, the drive elements of which bring about a toothed drive of the moving truck arrangement via driving surfaces arranged on the moving truck elements.

18. A movable truck arrangement suitable for use in the transport apparatus according to claim 1 comprising at least two movable truck elements and at least one connecting strut comprising a first end and a second end, wherein the first end and the second end of each connecting strut are connected to the movable truck elements located at opposite ends of the connecting struts, wherein each movable truck element comprises (1) at least one body, wherein each body comprises a first articulatable element and
(2) at least three rollers rotatably mounted on the body at spaced apart locations peripheral to the center longitudinal axis of the body;

wherein the second end of the connecting strut comprises a second articulatable element adapted for articulation with the first articulatable element of the body, the first and second articulatable elements are adapted to allow the body and connecting strut to pivot and rotate relative to each other, the first articulatable element is an articulatable ball cup mounted resiliently in the body, the second articulatable element is a ball adapted to articulate with the ball cup, and the body further comprises a ball sleeve portion adapted to press the articulatable ball onto the articulatable ball cup.

\* \* \* \* \*